United States Patent
Wakabayashi

(10) Patent No.: US 12,188,772 B2
(45) Date of Patent: Jan. 7, 2025

(54) INFORMATION PROCESSING APPARATUS AND INFORMATION PROCESSING METHOD FOR SELF-POSITION ESTIMATION

(71) Applicant: SONY GROUP CORPORATION, Tokyo (JP)

(72) Inventor: Hajime Wakabayashi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 232 days.

(21) Appl. No.: 17/756,616

(22) PCT Filed: Dec. 1, 2020

(86) PCT No.: PCT/JP2020/044630
§ 371 (c)(1),
(2) Date: May 27, 2022

(87) PCT Pub. No.: WO2021/117543
PCT Pub. Date: Jun. 17, 2021

(65) Prior Publication Data
US 2022/0412741 A1    Dec. 29, 2022

(30) Foreign Application Priority Data
Dec. 9, 2019    (JP) .................... 2019-221921

(51) Int. Cl.
*G01C 21/20* (2006.01)
*G01C 21/34* (2006.01)
(Continued)

(52) U.S. Cl.
CPC ......... *G01C 21/20* (2013.01); *G01C 21/3415* (2013.01); *G06T 7/70* (2017.01); *G06T 19/006* (2013.01); *G06V 20/46* (2022.01)

(58) Field of Classification Search
None
See application file for complete search history.

(56) References Cited

U.S. PATENT DOCUMENTS

| 9,947,230 | B2 * | 4/2018 | Hu .......................... B64C 27/08 |
| 2014/0323148 | A1 | 10/2014 | Schmalstieg et al. |
| 2015/0077434 | A1 | 3/2015 | Fukuchi et al. |

FOREIGN PATENT DOCUMENTS

| CN | 103377374 A | 10/2013 |
| CN | 105143821 A | 12/2015 |

(Continued)

OTHER PUBLICATIONS

International Search Report and Written Opinion of PCT Application No. PCT/JP2020/044630, issued on Jan. 19, 2021, 09 pages of ISRWO.

*Primary Examiner* — Todd Melton
(74) *Attorney, Agent, or Firm* — CHIP LAW GROUP

(57) ABSTRACT

An information processing apparatus according to the present technology includes a control unit. The control unit selects, from a plurality of key frames to be used in self-position estimation, a second key frame different from a first key frame assumed to correspond to a current self-position, performs content output for guiding to a position corresponding to the second key frame, and acquires environment information to be used in self-position estimation at the position corresponding to the second key frame.

20 Claims, 19 Drawing Sheets

(51) Int. Cl.
*G06T 7/70* (2017.01)
*G06T 19/00* (2011.01)
*G06V 20/40* (2022.01)

(56) References Cited

FOREIGN PATENT DOCUMENTS

| JP | 2013-225245 A | 10/2013 |
| JP | 2016-528476 A | 9/2016 |
| JP | 2018-173882 A | 11/2018 |

\* cited by examiner

INFORMATION PROCESSING APPARATUS AND INFORMATION PROCESSING METHOD FOR SELF-POSITION ESTIMATION

CROSS REFERENCE TO RELATED APPLICATIONS

This application is a U.S. National Phase of International Patent Application No. PCT/JP2020/044630 filed on Dec. 1, 2020, which claims priority benefit of Japanese Patent Application No. JP 2019-221921 filed in the Japan Patent Office on Dec. 9, 2019. Each of the above-referenced applications is hereby incorporated herein by reference in its entirety.

TECHNICAL FIELD

The present technology relates to technologies of an information processing apparatus and the like that perform processing related to self-position estimation.

BACKGROUND ART

In recent years, self-position estimation technologies have been widely used in augmented reality (AR) technology, a virtual reality (VR) technology, and the like. As this self-position estimation technology, there is known simultaneous localization and mapping (SLAM) that performs self-position estimation and environment map generation at the same time.

In the self-position estimation, initial-position estimation of estimating which position in the real world the apparatus is initially located is performed in some cases. This initial-position estimation technology is called relocalization or the like.

Patent Literature 1 below has disclosed a technology of estimating initial position and initial attitude by the use of a key-frame image. In the technology described in Patent Literature 1, first of all, a key-frame image most similar to an image from an image acquisition unit searched for and matching between the image from the image acquisition unit and the similar key-frame image is performed. Then, on the basis of feature points and map points of the similar key-frame image, feature points and map points of the image from the image acquisition unit are associated with each other, and the initial position and initial attitude of the apparatus are estimated on the basis of a predetermined algorithm.

CITATION LIST

Patent Literature

Patent Literature 1: Japanese Patent Application Laid-open No. 2018-173882

DISCLOSURE OF INVENTION

Technical Problem

For example, a similar view may exist in a remote location. In a case where the self-position estimation is performed on the basis of a key frame generated in such a location, the self-position estimation may be greatly incorrect.

In view of the above-mentioned circumstances, it is an objective of the present technology to provide a technology of improving the accuracy of self-position estimation in self-position estimation using a key frame.

Solution to Problem

An information processing apparatus according to the present technology includes a control unit. The control unit selects, from a plurality of key frames to be used in self-position estimation, a second key frame different from a first key frame assumed to correspond to a current self-position, performs content output for guiding to a position corresponding to the second key frame, and acquires environment information to be used in self-position estimation at the position corresponding to the second key frame.

In the information processing apparatus, the control unit may preferentially select a key frame having a relatively high degree of uniqueness as the second key frame.

In the information processing apparatus, the control unit may preferentially select a key frame having a relatively low degree of similarity to the first key frame as the second key frame.

In the information processing apparatus, the control unit may preferentially select a key frame having a relatively high degree of safety at the corresponding position as the second key frame.

In the information processing apparatus, the control unit may preferentially select a key frame having a relatively high degree of safety of a route from the first key frame as the second key frame.

In the information processing apparatus, the control unit may preferentially select a key frame having a relatively short distance from the first key frame as the second key frame.

In the information processing apparatus, the control unit may preferentially select a key frame with respect to which an image at the corresponding position is relatively unlikely to change over time as the second key frame.

In the information processing apparatus, the control unit may perform the content output in a format perceivable to the user.

In the information processing apparatus, content in the content output may include at least one of an image, sound, or vibration.

In the information processing apparatus, the control unit may set an initial position on the basis of the first frame.

In the information processing apparatus, the control unit may determine whether the initial position is correct on the basis of the second key frame and the environment information acquired at the position corresponding to the second frame.

In the information processing apparatus, the control unit may determine whether the initial position is correct on the basis of matching between the second key frame and the environment information acquired at the position corresponding to the second key frame.

In the information processing apparatus, the control unit may perform first self-position estimation of estimating the self-position on the basis of matching with the second key frame and second self-position estimation of estimating the self-position by using the initial position as a basis.

In the information processing apparatus, the control unit may determine whether the initial position is correct on the basis of a difference between a first self-position resulting from the first self-position estimation and a second self-position resulting from the second self-position estimation.

In the information processing apparatus, the control unit may perform redo processing of re-selecting the second key frame under a predetermined condition and performing content output for guiding to a position of the re-selected second key frame.

In the information processing apparatus, the condition may be that a redo instruction is input from a user.

In the information processing apparatus, the condition may be that a predetermined time has elapsed from a guiding start.

In the information processing apparatus, the condition may be that an obstacle is present at the position of the second key frame.

An information processing method according to the present technology includes:
  selecting, from a plurality of key frames to be used in self-position estimation, a second key frame different from a first key frame assumed to correspond to a current self-position;
  performing content output for guiding to a position corresponding to the second key frame; and
  acquiring environment information to be used in self-position estimation at the position corresponding to the second key frame.

A program according to the present technology causes a computer to execute processing of:
  selecting, from a plurality of key frames to be used in self-position estimation, a second key frame different from a first key frame assumed to correspond to a current self-position;
  performing content output for guiding to a position corresponding to the second key frame; and
  acquiring environment information to be used in self-position estimation at the position corresponding to the second key frame.

MODE(S) FOR CARRYING OUT THE INVENTION

Hereinafter, embodiments according to the present technology will be described with reference to the drawings.

First Embodiment

<Overall Configuration and Configurations of Respective Units>

Figure 1:
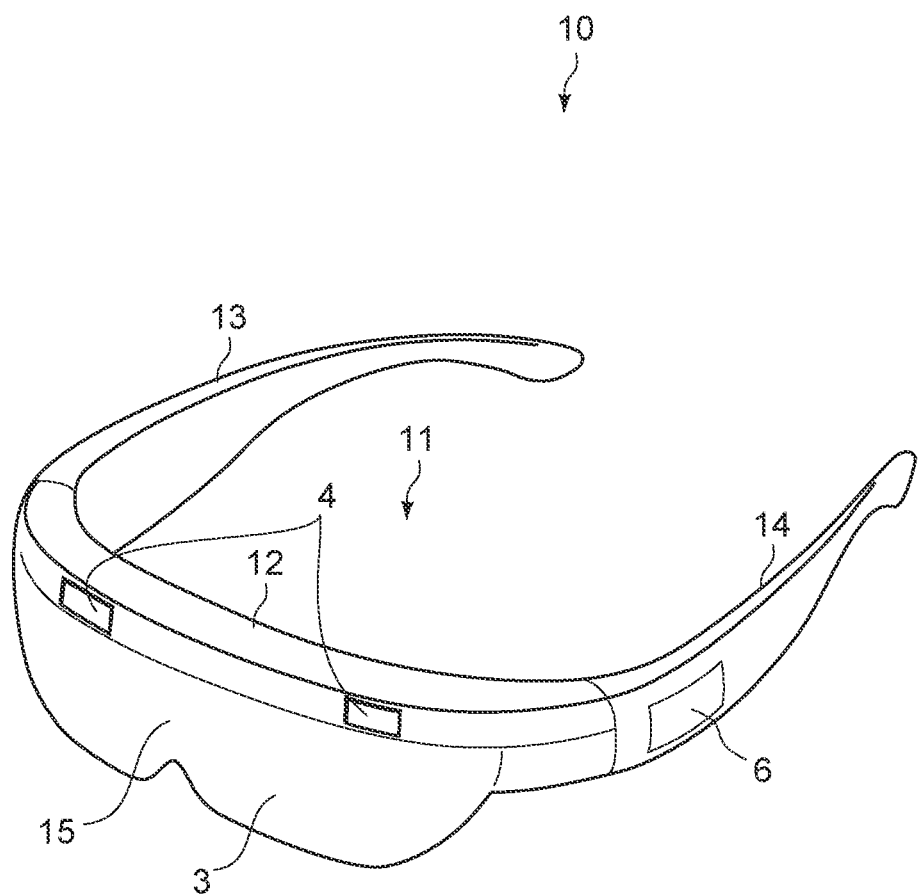
FIG. 1 A perspective view showing a head-mounted display according to a first embodiment of the present technology.
Figure 2:
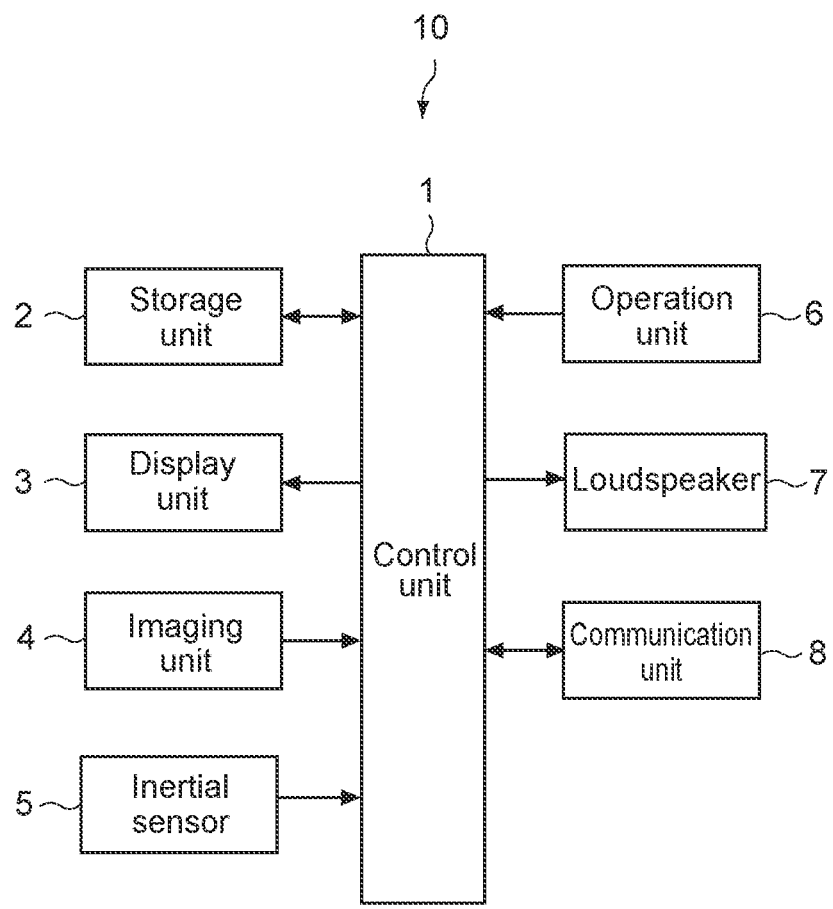
FIG. 2 A block diagram showing internal configurations of the head-mounted display.

FIG. 1 is a perspective view showing a head-mounted display 10 according to a first embodiment of the present technology. FIG. 2 is a block diagram showing internal configurations of the head-mounted display 10.

As shown in these figures, the head-mounted display 10 (AR terminal: an example of an information processing apparatus) includes a head-mounted display body 11, a control unit 1, a storage unit 2, a display unit 3, imaging units 4, an inertial sensor 5, an operation unit 6, a loudspeaker 7, and a communication unit 8.

The head-mounted display body 11 is mounted on a user's head for the use. The head-mounted display body 11 includes a front portion 12, a right temple portion 13 provided on the right side of the front portion 12, a left temple portion 14 provided on the left side of the front portion 12, and a glass portion 15 attached on the lower side of the front portion 12.

The display unit 3 is a see-through display unit 3 and is provided in a surface of the glass portion 15. The display unit 3 performs AR display under the control of the control unit 1. The AR display means performing display to enable the user to perceive as if a virtual object was a real object that exists in the real space. It should be noted that the display unit 3 may be a non-see-through display unit 3. In this case, an image captured by the imaging units 4 is displayed on the display unit 3.

The imaging units 4 are, for example, cameras and include imaging elements such as charge coupled device (CCD) sensors and complemented metal oxide semiconductor (CMOS) sensors and optical systems such as imaging lenses. The imaging units 4 are provided outward in an outer surface of the front portion 12. The imaging units 4 image an object that the user sees and output the captured image information to the control unit 1. The two imaging units 4 are provided in the front portion 12 with a predetermined horizontal distance between the imaging units 4. It should be noted that the positions where the imaging units 4 are provided and the number of imaging units 4 can be changed as appropriate.

The inertial sensor 5 includes a three-axis acceleration sensor that detects acceleration in three axial directions and an angular velocity sensor that detects angular velocity around the three axes. The inertial sensor 5 outputs to the control unit 1 the detected acceleration in the three axial directions and the detected angular velocity around the three axes as inertial information.

Although the detection axis of the inertial sensor 5 is set to the three axes in this embodiment, the detection axis may be a single axis or two axes. Moreover, although two types of sensors are used as the inertial sensor 5 in this embodiment, one or three types of sensors may be used as the inertial sensor 5. It should be noted that other examples of the inertial sensor 5 can include a speed sensor, an angle sensor, and the like.

The operation unit 6 is, for example, various types of operation units such as press-type and contactless type. The operation unit 6 detects an operation made by the user and outputs the operation to the control unit 1. Although the operation unit 6 is provided on the front side of the left temple portion 14 in the example shown in FIG. 1, the position of the operation unit 6 may be any position as long as the user can easily operate the operation unit 6.

The loudspeaker 7 receives a sound signal output from the control unit 1 and converts the sound signal into sound and outputs the sound. The communication unit 8 communicates with an external device directly or indirectly. Examples of the external device that communicates with the head-mounted display 10 can include various types of PCs (personal computers) such as a desktop PC, a laptop PC, and a tablet PC, a mobile phone (including smartphone), and a server device on a network.

The control unit 1 is constituted by a central processing unit (CPU). The control unit 1 performs various arithmetic operations on the basis of various programs stored in the storage unit 2 and comprehensively controls the respective units of the head-mounted display 10. It should be noted that the processing of the control unit 1 will be described later in detail in the section of "Description of Operation".

The storage unit 2 includes various programs required for the processing of the control unit 1, a nonvolatile memory in which various types of data are stored, and a volatile memory used for the working region of the control unit 1. It should be noted that the various programs may be read from a portable storage medium such as an optical disc and a semiconductor memory or may be downloaded from the server device on the network.

In this embodiment, in particular, an environment map is stored in the storage unit 2. In the environment map, a plurality of key frames and metadata related to the key frames are generated as a database in association with each other.

The key frames is information to be used in self-position estimation and is information to be targets to be compared with information (environment information) such as external-environment images acquired at the current position. The key frames include images, coordinate information of the key frames, depth information, position information of feature points, and the like. The coordinates in the key frames are set in 3D coordinates systems having the same origin. The environment map and the metadata will be described later in detail.

It should be noted that although a case where the environment map is in the storage unit 2 of the head-mounted display 10 will be described in the embodiment, for example, the server device on the network may include the environment map.

<Basic Concept>

Figure 3:
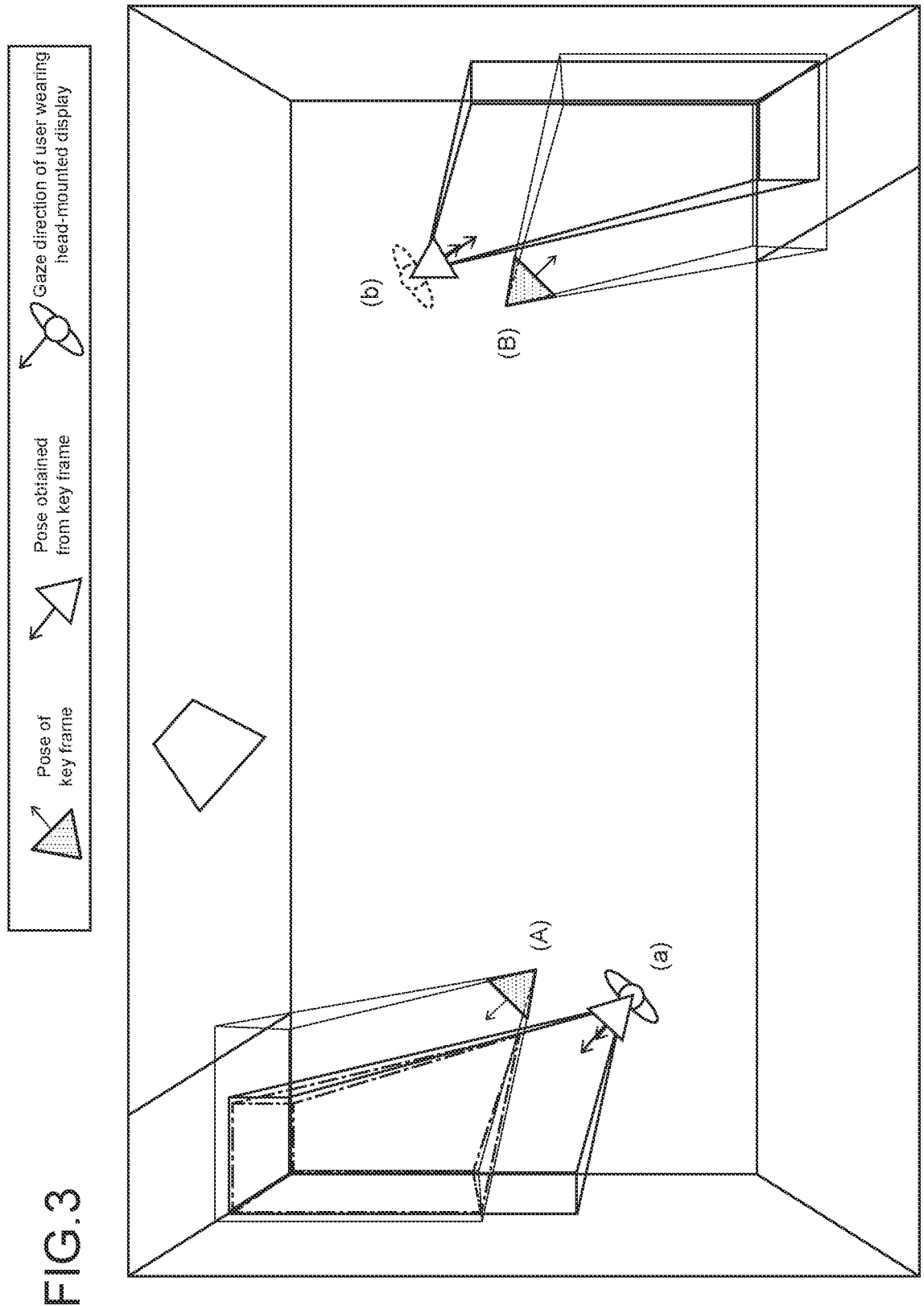
FIG. 3 A diagram showing a state when initial-position estimation of the head-mounted display is incorrect in a case where a plurality of key frames based on similar views is present.

Next, the basic concept of the present technology will be described. FIG. 3 is a diagram showing a state when the initial-position estimation of the head-mounted display 10 is incorrect in a case where there is a plurality of key frames based on similar views.

In the initial-position estimation based on the relocalization, first of all, feature points of the image currently captured by the imaging units 4 are compared with feature points of each key frame. Accordingly, a key frame including an image most similar to the image captured by the imaging units 4 is selected from the plurality of key frames. Next, matching of feature points in a common region of a region included in the image of the key frame and a region included in the image currently captured by the imaging units 4 is performed. Then, initial position and initial attitude (hereinafter, initial position and initial attitude will be simply abbreviated as initial position) of the head-mounted display 10 are estimated on the basis of coordinate information and position information of the feature points of the key frame.

Here, it is assumed that the key frames are respectively present at points (A) and (B) as shown in FIG. 3. Moreover, it is assumed that the user wearing the head-mounted display 10 is present at the point (a), not the point (b).

In this example, since the head-mounted display 10 (user) is present at the point (a), the initial position of the head-mounted display 10 should be estimated on the basis of the key frame of (A) normally. Meanwhile, although the key frames at the points (A) and (B) are key frames at different points, they are key frames based on images obtained by imaging a corner of a room including a door at similar angles, and the images obtained by imaging from the locations of the key frames are similar to each other.

Therefore, in the initial-position estimation based on the relocalization, when a key frame including an image most similar to the image captured by the imaging units 4 is selected from the plurality of key frames, the key frame at the point (B), not the point (A) may be selected. In this case, although the head-mounted display 10 is actually present at the point (a), it is determined that the head-mounted display 10 is present at the point (b), and the initial position is set to this point (b).

In an environment where humanity lives, a similar view may be present at a remote location. Therefore, a plurality of key frames, with respect to which images obtained by imaging from the corresponding locations are similar, may be present, and the initial-position estimation of the head-mounted display 10 may be greatly incorrect. Moreover, the AR display may be performed at an undesired position in a case of such inaccurate initial-position estimation.

Figure 4:
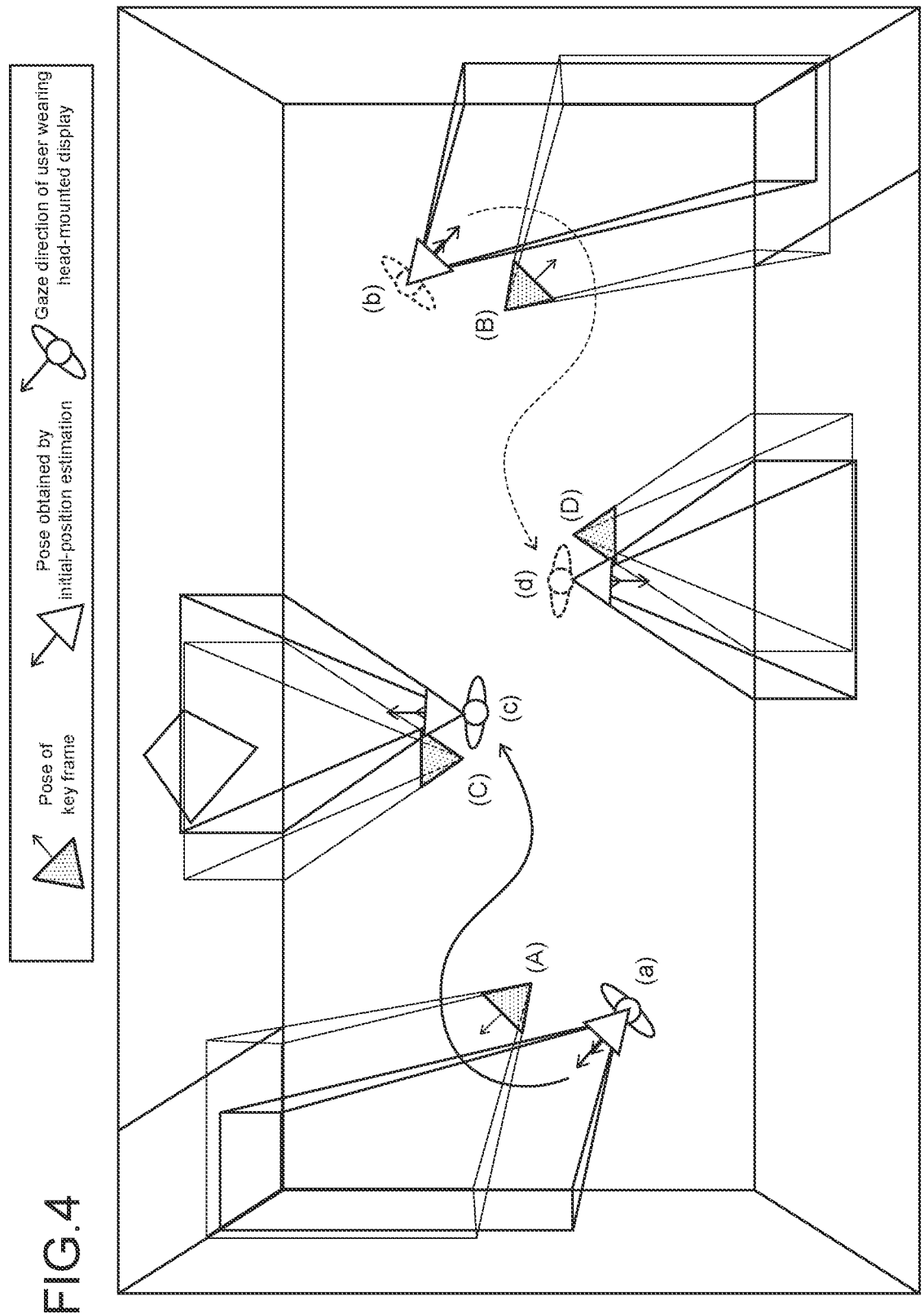
FIG. 4 A diagram showing the basic concept of the present technology.

FIG. 4 is a diagram showing the basic concept of the present technology. In the example shown in FIG. 4, key frames are present at the points (A), (B), (C), and (D), respectively. Moreover, the user wearing the head-mounted display 10 is initially present at the point (a), not the point (b).

Since the head-mounted display 10 (user) is present at the point (a), the initial position of the head-mounted display 10 should be estimated on the basis of the key frame of (A) normally. On the other hand, with respect to the key frame at the point (A) and the key frame at the point (B), images obtained by imaging from the corresponding locations are similar to each other. Therefore, the control unit 1 of the head-mounted display 10 is incapable of correctly determining which key frame of the key frames at the points (A) and (B) is to be used in initial-position estimation.

For example, when a key frame including an image most similar to the image captured by the imaging units 4 is selected from the plurality of key frames, either one of the key frames at the points (A) and (B) can be selected.

It is assumed that the key frame at the point (A), which is correct, is selected and the initial position is estimated on the basis of the key frame of this point (A). Here, the control unit 1 has recognized in advance that the key frame is also present at the point (C) (environment map). The control unit 1 guides the user to the point (C) and attempts to perform matching between the image at the point (c) by the imaging units 4 and the key frame at the point (C). In this case, since the key frame of (A), which is correct, has been selected, the self-position can be estimated on the basis of the image at the point (c) by the imaging units 4 and the key frame at the point (C).

In contrast, it is assumed that the key frame at the point (B), which is incorrect, is selected and the initial position is estimated on the basis of the key frame of this point (B). At this time, although the control unit 1 has misrecognized that the head-mounted display 10 (user) is present at the point (b), the head-mounted display 10 (user) is actually present at the point (a).

The control unit 1 has recognized in advance that the key frame is also present at the point (D) (environment map). The control unit 1 guides the user to the point (D) and attempts to perform matching between the image at the point (d) by the imaging units 4 and the key frame at the point (D). However, the head-mounted display 10 (user) has actually moved from the point (a) to the point (c). Therefore, the image at the point (c), not the image at the point (d), is acquired from the imaging units 4.

Therefore, in this case, the control unit 1 performs not matching between the image at the point (d) and the key frame at the point (D), but matching between the image at the point (c) and the key frame at the point (D). In this case, the self-position cannot be estimated. It should be noted that although the example in which the key frame of (C) is present at the position corresponding to the key frame at the point (D) as the guide destination is shown in the figure, in a case where the initial position is incorrect, the key frame itself may not be actually present at the position corresponding to (D) as the guide destination.

In the present technology, a relationship in which the self-position can be estimated at the position of the key frame as the guide destination in a case where the estimated initial position is correct, and the self-position cannot be estimated at the position of the key frame as the guide destination in a case where the estimated initial position is incorrect is utilized. Then, the accuracy of the self-position estimation (initial-position estimation) is enhanced utilizing this relationship.

It should be noted that the key frame at the point (C) or the key frame at the point (D), i.e., the key frame (second key frame) as the guide destination is selected in accordance with various criteria as will be described below. For example, in a case where the images of the key frames at the points (A) and (B) before guiding are similar and the images of the key frames at the points (C) and (D) as the guide destinations are similar, erroneous determination may occur also at the guide destinations and double erroneous determination may occur.

For example, in the above-mentioned example, it is assumed that the initial position is incorrectly set to the point (b), and then matching between the image at the point (c) and the key frame at the point (D) is performed after guiding. In this case, since the image by the imaging units 4 and the image of the key frame are images at different points, it must be normally impossible to estimate the self-position. On the other hand, in a case where the images of the key frames at the points (C) and (D) are similar, although matching of the images at different points, at the image at the point (c) and the image of the key frame at the point (D), is performed, it may be possible to estimate the self-position. In this case, it may be erroneously determined that the initial position of the point (b) is correct.

Therefore, typically, a key frame having a relatively high degree of uniqueness as compared with other key frames is selected as the key frame (second key frame) as the guide destination.

<Description of Operation>

Figure 5:
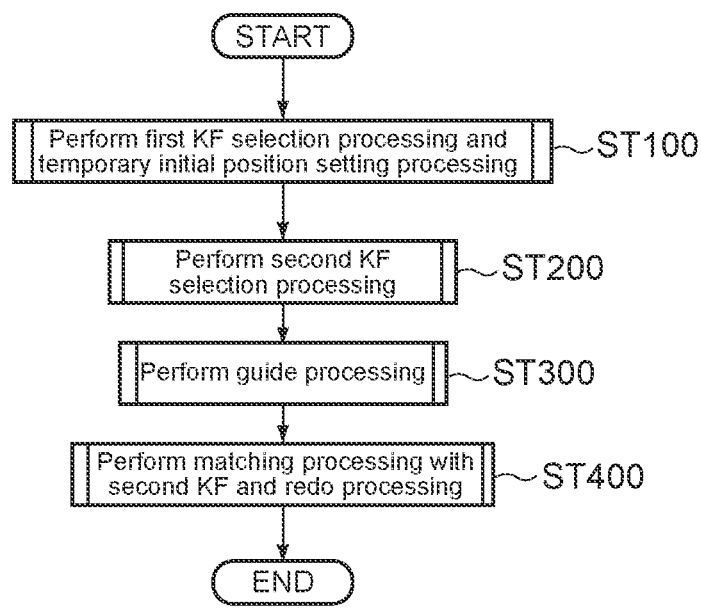
FIG. 5 A flowchart showing processing of a control unit.
Figure 6:
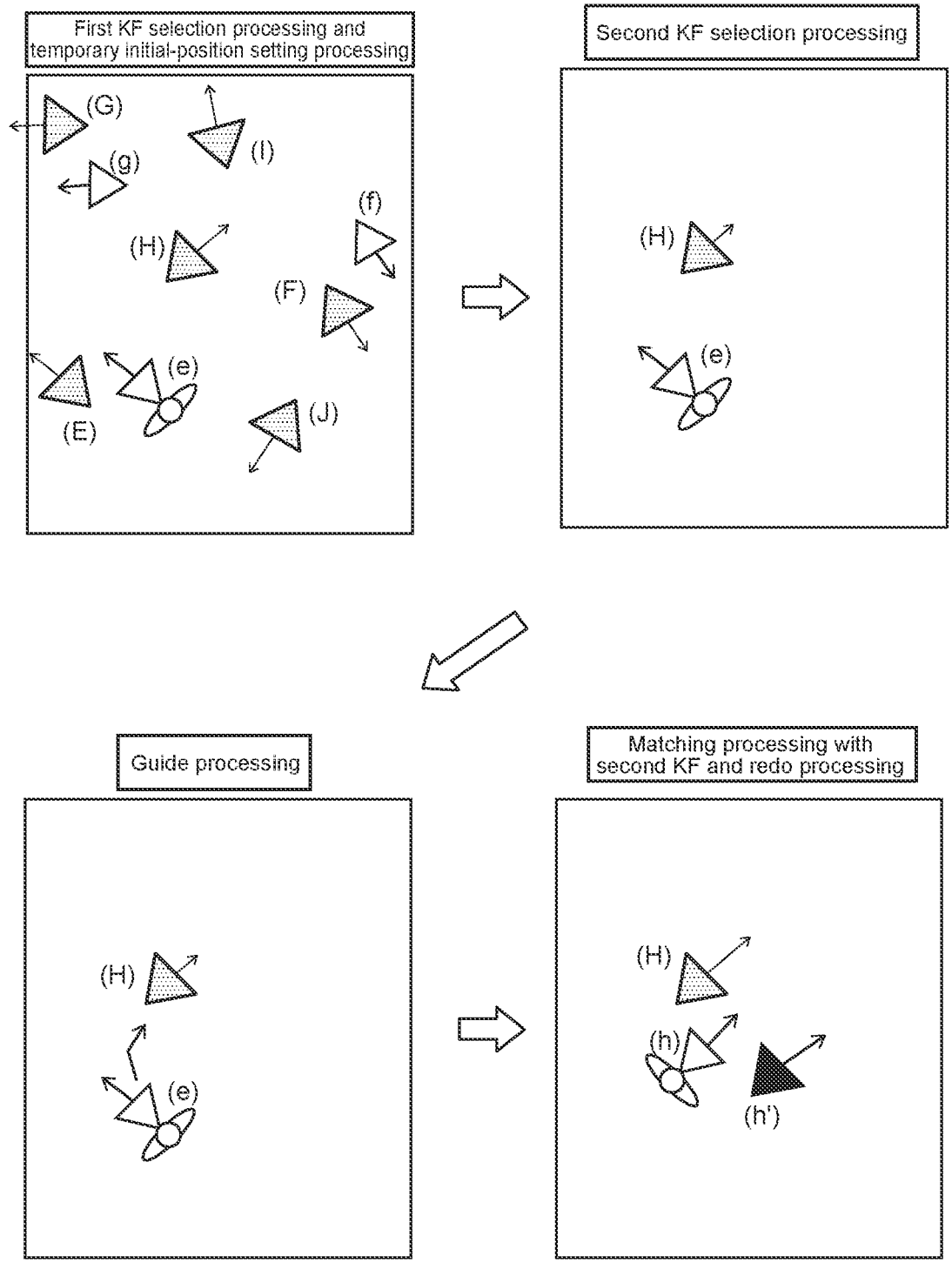
FIG. 6 A diagram showing user's position and the like when respective processes in the control unit is performed.

Next, the processing of the control unit 1 will be described specifically. FIG. 5 is a flowchart showing the processing of the control unit 1. FIG. 6 is a diagram showing the user's position and the like when respective processes in the control unit 1 are performed.

As shown in FIGS. 5 and 6, first of all, the control unit 1 performs first key frame selection processing and temporary initial position setting processing (Step 100), and then performs second key frame selection processing (Step 200). Next, the control unit 1 performs guide processing (Step 300), and then performs matching processing with the second key frame and redo processing.

It should be noted that a first key frame is a key frame to be used for initially setting the initial position and a second key frame is a key frame as a guide destination selected for determining whether the initial position was correct.

Here, a case where the key frame is image information will be described in the embodiment. On the other hand, the key frame may be three-dimensional information acquired by light detection and ranging (lidar) or the like. The lidar is capable of detecting a distance to a target object, a direction of the target object, and the like by measuring a time from emission of laser light from a light-emitting portion to reception of laser light by a light-receiving portion through reflection on the target object. This lidar is capable of recording the direction and the distance in which/at which pulsed laser light is reflected as points in a three-dimensional point cloud and is capable of acquiring the surrounding environment of the user as information regarding the three-dimensional point cloud.

In this case, environment information acquired at the position of the second key frame that is the guide destination may also be three-dimensional information acquired by for example, the lidar or the like correspondingly. The environment information is information to be compared with the second key frame, which is acquired at the position corresponding to the second key frame that is the guide destination, and is information to be used in self-position estimation.

[First Key Frame Selection Processing and Temporary Initial Position Setting Processing]

Figure 7:
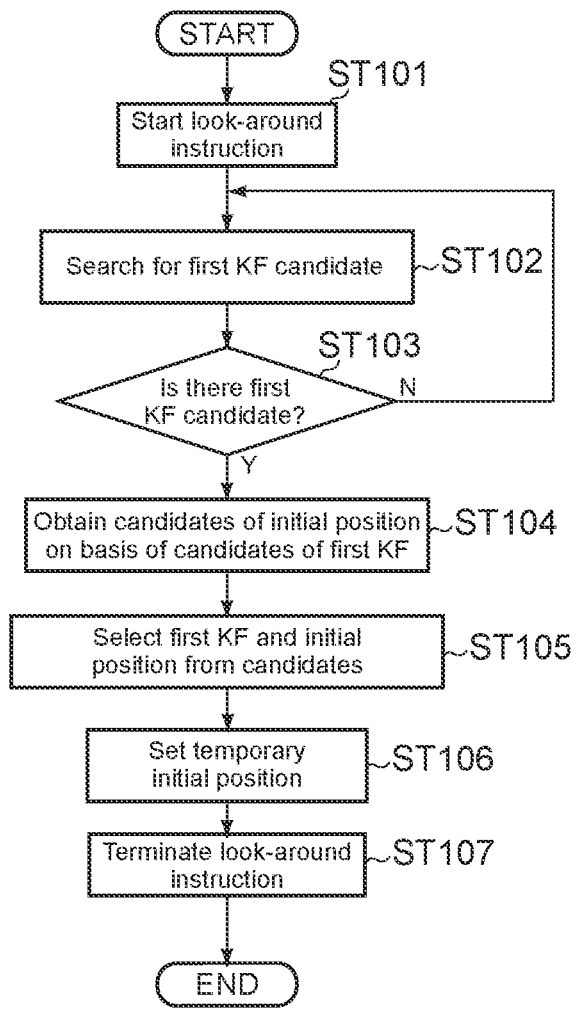
FIG. 7 A flowchart showing first key frame selection processing and temporary initial position setting processing.

Next, the first key frame selection processing and the temporary initial position setting processing will be described specifically. FIG. 7 is a flowchart showing the first key frame selection processing and the temporary initial position setting processing.

The first key frame selection processing and the temporary initial position setting processing are performed when the head-mounted display 10 is activated or when an arbitrary application is started in the head-mounted display 10. Although examples of the application executed in the head-mounted display 10 can include an application for entertainment such as a game and an application for a guide or the like, the type of application is not particularly limited.

As shown in FIG. 7, first of all, the control unit 1 issues an instruction to the user to take a look around (Step 101). This look-around instruction is performed for facilitating matching between the image acquired by the imaging units 4 and each key frame in the environment map.

Figure 8:
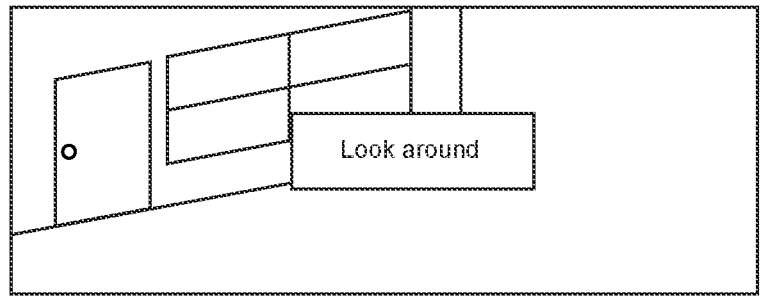
FIG. 8 A diagram showing examples of content output in a look-around instruction.
Figure 8:
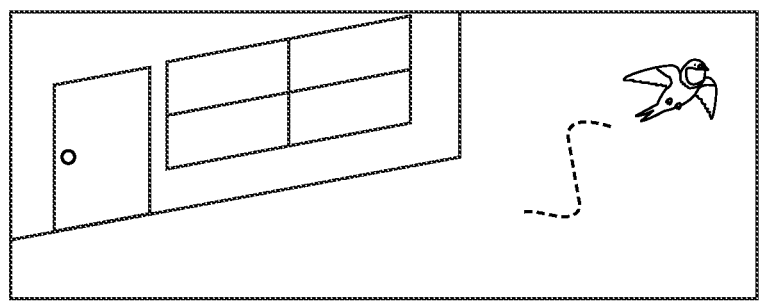
Figure 8:
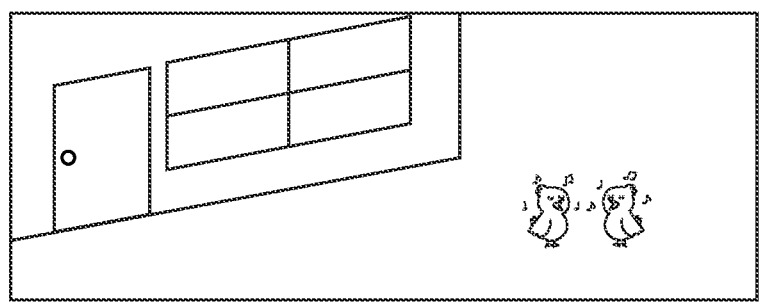

FIG. 8 is a diagram showing examples of content output in the look-around instruction. At the top of FIG. 8, an example in a case where the text "Look about" is displayed on the display unit 3 is shown. In the middle of FIG. 8, an example in a case where the AR display in which a virtual object of a bird is flying to the end side of the display unit 3 is performed is shown. In this example, the user can take a look around automatically by following the virtual object flying about with the eyes.

Moreover, at the bottom of FIG. 8, an example in a case where virtual objects of birds are displayed in augmented reality on the end side of the display unit 3 and also, the birds' singing sound (or the birds' sound saying "Look about") is output from the loudspeaker 7 is shown. In this example, the user can take a look around automatically by seeing in the direction of the virtual object.

The virtual object may be an object related to an application to be executed then. For example, in a case where the application to be executed is a game or the like, the virtual object may be a character or the like who appears in a game.

The content output in the look-around instruction may be vibration. In this case, for example, the right temple portion 13 and the left temple portion 14 are provided with vibrators, respectively. Then, the vibrator of the right temple portion 13 is made to vibrate for causing the user to look to the right, and the vibrator of the left temple portion 14 is made to vibrate for causing the user to look to the left.

The content output in the look-around instruction may be performed in any format as long as the content output in the look-around instruction can be performed in a format perceivable to the user. Typically, it is sufficient that the content output in the look-around instruction is at least one of an image, sound, or vibration.

When the look-around instruction is performed, then the control unit 1 searches for candidates of the first key frame from a plurality of key frames in the environment map on the basis of the relocalization (Step 102). In this search, first of all, the control unit 1 compares feature points of the image currently acquired by the imaging units 4 with feature points of each key frame in the environment map. Then, the control unit 1 selects key frames, with respect to which the number of feature points that match with the feature points of the image by the imaging units 4 is equal to or larger than a threshold (N), as the candidates of the first key frame.

In the upper left example of FIG. 6, an example in a case where key frames of points (E), (F), and (G) are selected as the candidates of the first key frame is shown.

Next, the control unit 1 determines whether the candidates of the first key frame are present (Step 103). In a case where the candidates of the first key frame have not yet been found (NO in Step 103), the control unit 1 returns to Step 102 and searches for the candidates of the first key frame.

In a case where the candidates of the first key frame are present (YES in Step 103), the control unit 1 obtains candidates of the corresponding initial positions on the basis of the candidates of the first key frame (Step 104).

In Step 104, first of all, the control unit 1 performs matching of feature points in a common region of regions included in the images of the candidates of the first key frame and a region included in the image currently captured by the imaging units 4. Then, the control unit 1 obtains candidates of initial position and initial attitude of the head-mounted display 10 (hereinafter, simply referred to as candidates of initial position) on the basis of the coordinate information and the position information of the feature points in the candidates of the first key frame.

In the upper left example of FIG. 6, an example in a case where with respect to the candidates of the first key frame of the points (E), (F), and (G), the candidates of the initial position of the points of (e), (f), and (g) have been obtained, respectively, is shown.

When the candidates of the initial position are obtained, the control unit 1 shifts to next Step 105. In Step 105, the control unit 1 selects, from the candidates of the first key frame and the candidates of the initial position, candidates which are most likely to be correct (having a highest degree of matching with the image from the imaging units 4) as the first key frame and the initial position.

In the upper left example of FIG. 6, an example in a case where the candidates of (E) and (e) have been selected as the first key frame and the initial position from the candidates of the first key frame of the points (E), (F), and (G) and the candidates of the initial position of (e), (f), and (g) is shown.

It should be noted that the case where the first key frame and the initial position are selected from the candidates of the first key frame and the candidates of the initial position has been described in this example. On the other hand, without searching for these candidates, a key frame including an image most similar to the image captured by the imaging units 4 may be directly selected as the first key frame and the initial position may be obtained on the basis of this first key frame.

When the first key frame and the initial position are selected, then the control unit 1 sets the selected initial position as a temporary initial position (Step 106) and terminates the look-around instruction (Step 107).

<Second Key Frame Selection Processing>

Next, processing for selecting the second key frame different from the first key frame from the plurality of key frames in the environment map will be described. It should be noted that in the upper right example of FIG. 6, a state in which the key frame at the point (H) is selected as the second key frame from the plurality of key frames in the environment map is shown.

In the first embodiment, a key frame that satisfies the following determination criteria is preferentially selected as the second key frame that is the guide destination.

1. Having a Relatively High Degree of Uniqueness
(Having a Low Degree of Similarity to the Other Key Frame in the Environment Map)

If an (ordinary) key frame including an image having a high degree of similarity to the images of the other key frames in the environment map is selected as the second key frame, double erroneous determination can occur as described above with reference to FIG. 4. Therefore, typically, a key frame having a relatively high degree of uniqueness is preferentially selected as the second key frame.

2. Degree of Similarity to First Key Frame Is Relatively Low

For example, a case where there are many views similar to the first key frame around the position (temporary initial position) of the first key frame will be assumed. In this case, when a key frame including an image similar to the image of the first key frame is selected as the second key frame, the above-mentioned double erroneous determination can occur even if the degree of uniqueness of that second key frame is high. Therefore, typically, a key frame including an image having a relatively low degree of similarity to the image of the first key frame is preferentially selected as the second key frame.

3. Degree of Safety at Corresponding Position Is Relatively High

For example, when the user is guided to the position corresponding to the second key frame, the safety for the user cannot be ensured in a case where that point is located on a roadway, a railroad crossing, stairs, or the like. Therefore, typically, a key frame having a relatively high degree of safety at the corresponding position is preferentially selected as the second key frame.

4. Degree of Safety of Route from First Key Frame Is Relatively High

For example, in a case where the user passes along a part without a sidewalk or passes along a pedestrian crossing or railroad crossing many times when the user is guided to the position corresponding to the second key frame from the position corresponding to the first key frame, the safety for the user cannot be ensured. Therefore, typically, a key frame having a relatively high degree of safety of the route from the first key frame is preferentially selected as the second key frame.

5. Distance from First Key Frame Is Relatively Short

For example, in a case where the distance from the first key frame is long, it takes time and the user gets tired. Therefore, typically, a key frame having a relatively short distance from the first key frame is preferentially selected as the second key frame.

In the description of the second key frame selection processing, a key frame that satisfies all the determination criteria of 1. to 5. is selected as the second key frame. It should be noted that other determination criteria in the selection of the second key frame will be described later in detail.

Figure 9:
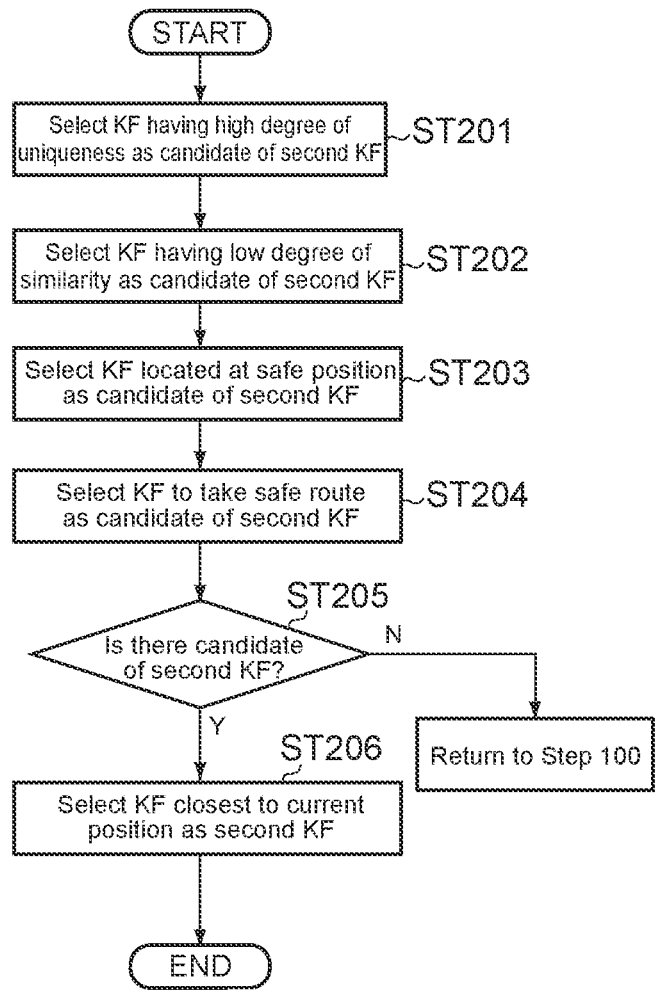
FIG. 9 A flowchart showing selection processing of a second key frame.

FIG. 9 is a flowchart showing the second key frame selection processing.

"1. Degree of Uniqueness"

As shown in FIG. 9, first of all, the control unit 1 selects, from the plurality of key frames (excluding the first key frame) in the environment map, key frames having a relatively high degree of uniqueness (having a relatively low degree of similarity to the other key frame) as candidates of the second key frame (Step 201). In this case, the control unit 1 selects key frames having a degree of uniqueness equal to or larger than a predetermined threshold, as the candidates of the second key frame.

For example, at the time of key frame acquisition or the like, the control unit 1 calculates a degree of uniqueness for each key frame in advance. In calculation of the degree of uniqueness, first of all, the control unit 1 extracts a feature amount for each key-frame image by, for example, application of a bag of visual words or the like. Then, the control unit 1 calculates each of differences between the feature amount of the key frame and the feature amounts of the other key frames and calculates an average value of the feature amount differences. For example, this average value of the differences is used as the degree of uniqueness. The degree of uniqueness is associated with the key frame and stored in the environment map as metadata of that key frame.

"2. Degree of Similarity"

When the key frames having a high degree of uniqueness are selected as the candidates of the second key frame, then the control unit 1 selects, from the candidates, a key frame including an image having a relatively low degree of similarity to the image of the first key frame and further narrows down the candidates of the second key frame (Step 202). In this case, the control unit 1 selects key frames having a degree of similarity is equal to or smaller than a predetermined threshold, as the candidates of the second key frame.

For example, at the time of key frame acquisition or the like, the control unit 1 calculates a degree of similarity to the image of the other key frame for each key frame in advance. In calculation of the degree of similarity, first of all, the control unit 1 extracts a feature amount for each key-frame image by, for example, application of a bag of visual words or the like. Then, the control unit 1 calculates each of differences between the feature amount of the key frame and the feature amounts of the other key frames. For example, this difference is used as the degree of similarity.

This degree of similarity is associated with the key frame and is stored in the environment map as metadata of that key frame. The control unit 1 is capable of recognizing the first key frame and the degree of similarity to the other key frame when information regarding the degree of similarity corresponding to the first key frame is read.

"3. Degree of Safety of Corresponding Position"

When key frames having a low degree of similarity are selected as the candidates of the second key frame, then the control unit 1 selects, from the candidates, key frames having a relatively high degree of safety at the corresponding position and further narrows down the candidates of the second key frame (Step 203). In this case, the control unit 1 selects key frames having a degree of safety equal to or larger than a predetermined threshold, as the candidates of the second key frame.

How to determine the degree of safety of the position corresponding to the second key frame will be described specifically by taking an example.

(Class Setting Processing of Respective Points in Three-Dimensional Point Cloud)

In the first embodiment, the class setting processing of each point in the three-dimensional point cloud is performed as a preparation stage for determining the degree of safety of the position of the second key frame (and the degree of safety of the route from the first key frame). First of all, this class setting processing will be described. It should be noted that this class setting processing is performed in advance at the time of key frame acquisition or the like.

Figure 10:
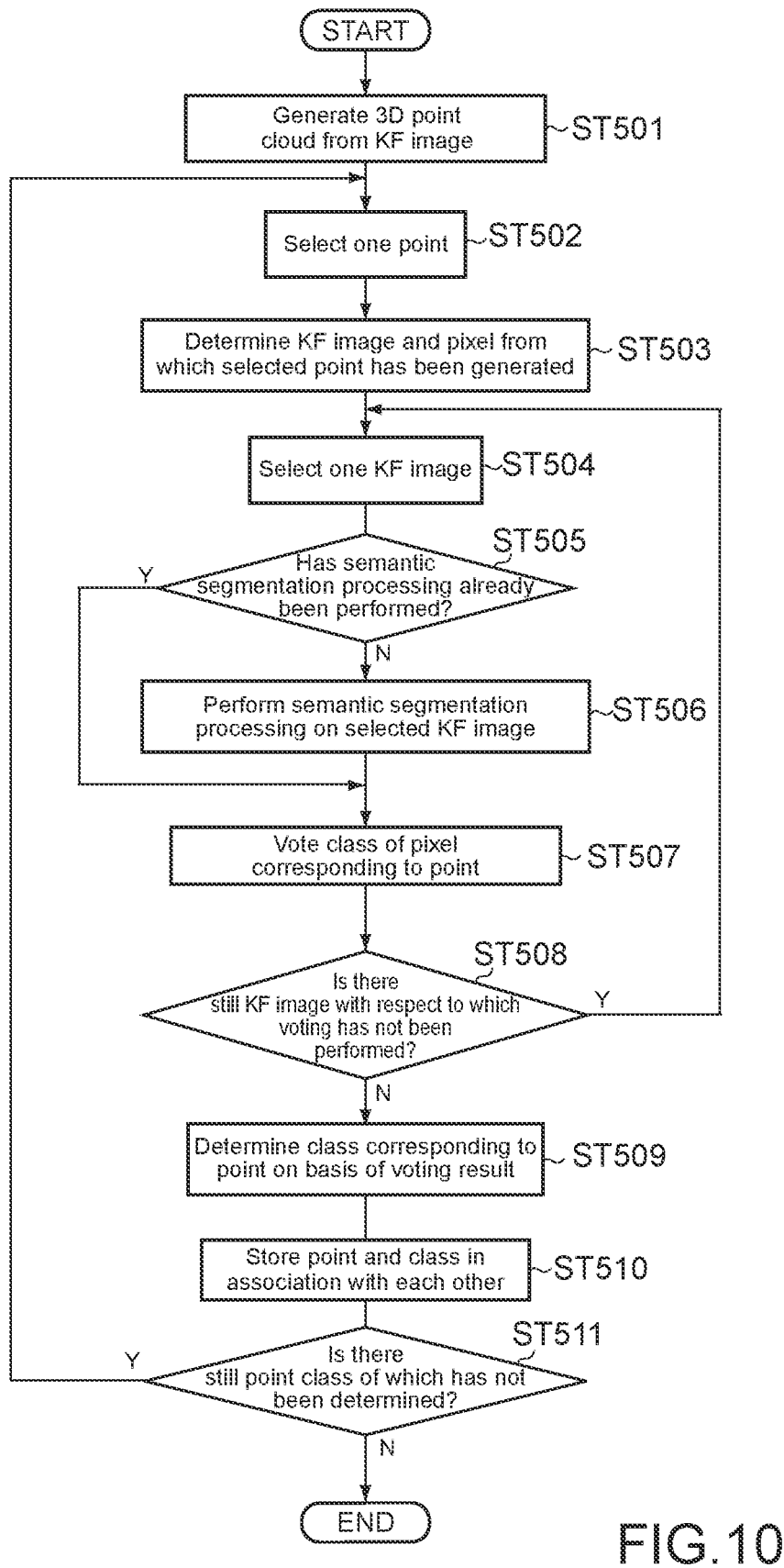
FIG. 10 A flowchart showing class setting processing for each point in a three-dimensional point cloud.

FIG. 10 is a flowchart showing the class setting processing of each point in the three-dimensional point cloud. As shown in FIG. 10, first of all, the control unit 1 generates a three-dimensional point cloud on the basis of the key-frame image in the environment map (Step 501). The three-dimensional point cloud is generated from, for example, attitude information of the head-mounted display 10 obtained by the SLAM performed at the time of capturing the key-frame image, angle-of-view information of the imaging units 4, depth information, structure from motion (SfM), and the like.

Next, the control unit 1 selects one point from the three-dimensional point cloud (Step 502). Next, the control unit 1 determines the original key-frame image from which the selected point has been generated and its pixel (Step 503). Next, the control unit 1 selects one key-frame image from the original key-frame image from which the point has been generated (Step 504). It should be noted that the number of original key-frame images from which the point has been generated may be single or may be plural.

Next, the control unit 1 determines whether semantic segmentation processing has already been performed on the selected key-frame image (Step 505).

In a case where the semantic segmentation processing has not yet been performed (NO in Step 505), the control unit 1 performs the semantic segmentation processing on the selected key-frame image (Step 506). The semantic segmentation processing is a technology of performing classification on a pixel-by-pixel basis and performing object recognition for each pixel.

Figure 11:
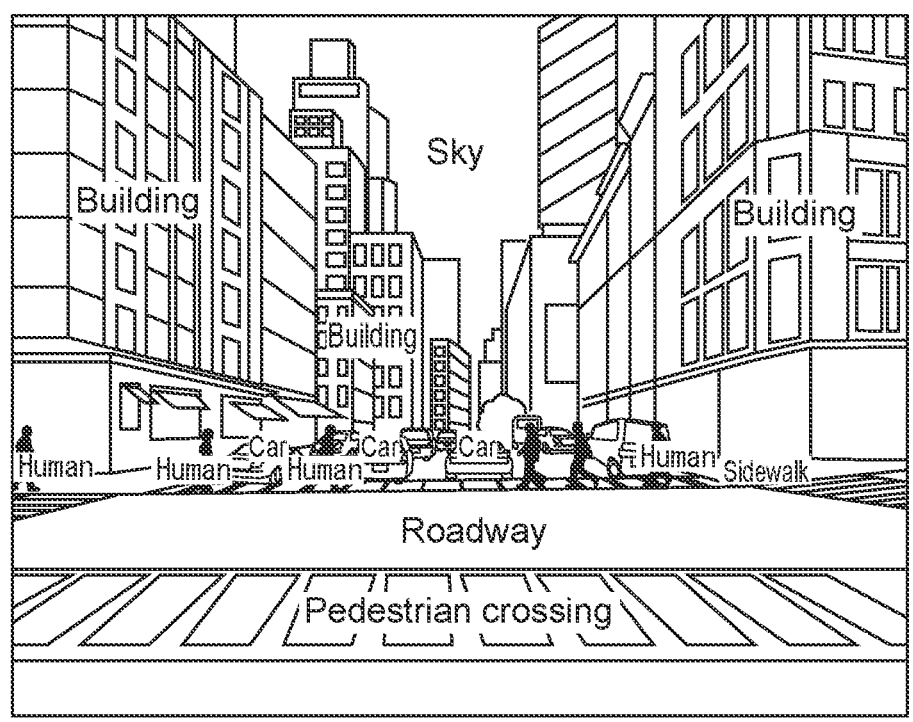
FIG. 11 A diagram showing an example of a classified image.

FIG. 11 is a diagram showing an example of a classified image. In FIG. 10, an example in a case where the image is classified as the sky, a building, a human, a car, a roadway, a sidewalk, a pedestrian crossing, or the like for each pixel is shown. Although the classification can be automatically performed by the control unit 1 using machine learning, a human can also manually perform the classification.

After the semantic segmentation processing, the control unit 1 stores a result of the processing (classification for each pixel) in the storage unit 2 in association with the key frame and shifts to next Step 507. Moreover, in a case where the semantic segmentation processing has already been performed (YES in Step 505), the control unit 1 reads, from the storage unit 2, a result of semantic segmentation processing (classification for each pixel) corresponding to the selected key-frame image and shifts to next Step 507.

In Step 507, the control unit 1 determines a class of the original pixel from which the point of the three-dimensional point cloud has been generated. Then, the control unit 1 votes the determined class, and that is voting of the class with respect to the point, which is based on the key-frame image. Next, the control unit 1 determines whether there is still a key-frame image with respect to which voting has not been performed (Step 508).

In a case where there is still a key-frame image with respect to which voting has not been performed (YES in Step 508), the control unit 1 returns to Step 504, and the original key-frame image from which the point has been generated and its pixel are determined, and the processing after Step 505 is performed again.

In a case where voting of all original key-frame images from which the points have been generated has been completed (NO in Step 508), the control unit 1 determines a class corresponding to the point on the basis of the voting result (Step 509).

As an example, for example, it is assumed that points in the three-dimensional point cloud have been generated on the basis of three key-frame images. Moreover, it is assumed that voting results of the class of that point in the three key-frame images are a roadway, a pedestrian crossing, and a pedestrian crossing. In this case, the pedestrian crossing having the largest number of votes is determined as the class of that point. It should be noted that in a case where classification is unknown, the class of that point is determined to be unknown.

When the class is determined, then the control unit 1 stores, in the storage unit 2, the point and the class in association with each other (Step 510). Next, the control unit 1 determines whether there is still a point the class of which has not been determined (Step 511).

In a case where there is still a point the class of which has not been determined (YES in Step 511), the control unit 1 returns to Step 502, an unprocessed point is selected from the three-dimensional point cloud, and the processing after Step 503 is performed again. On the other hand, in a case where with respect to all the points in the three-dimensional point cloud, the classes have been determined (NO in Step 511), the control unit 1 terminates the processing. In this manner, the class setting processing of each point in the three-dimensional point cloud is performed.

(Class Setting Processing for Floor of Key Frame)

Next, utilizing the classified three-dimensional point cloud, class setting processing of a floor at the position corresponding to the key frame is performed. That is, in a case where the class of the floor (sidewalk, pedestrian crossing, grass, roadway, railroad crossing, building floor, hallway, and the like) at the position corresponding to the key frame has been recognized in advance, classification on the floor of the key frame is performed in advance because the degree of safety at the position of the key frame is known.

Figure 12:
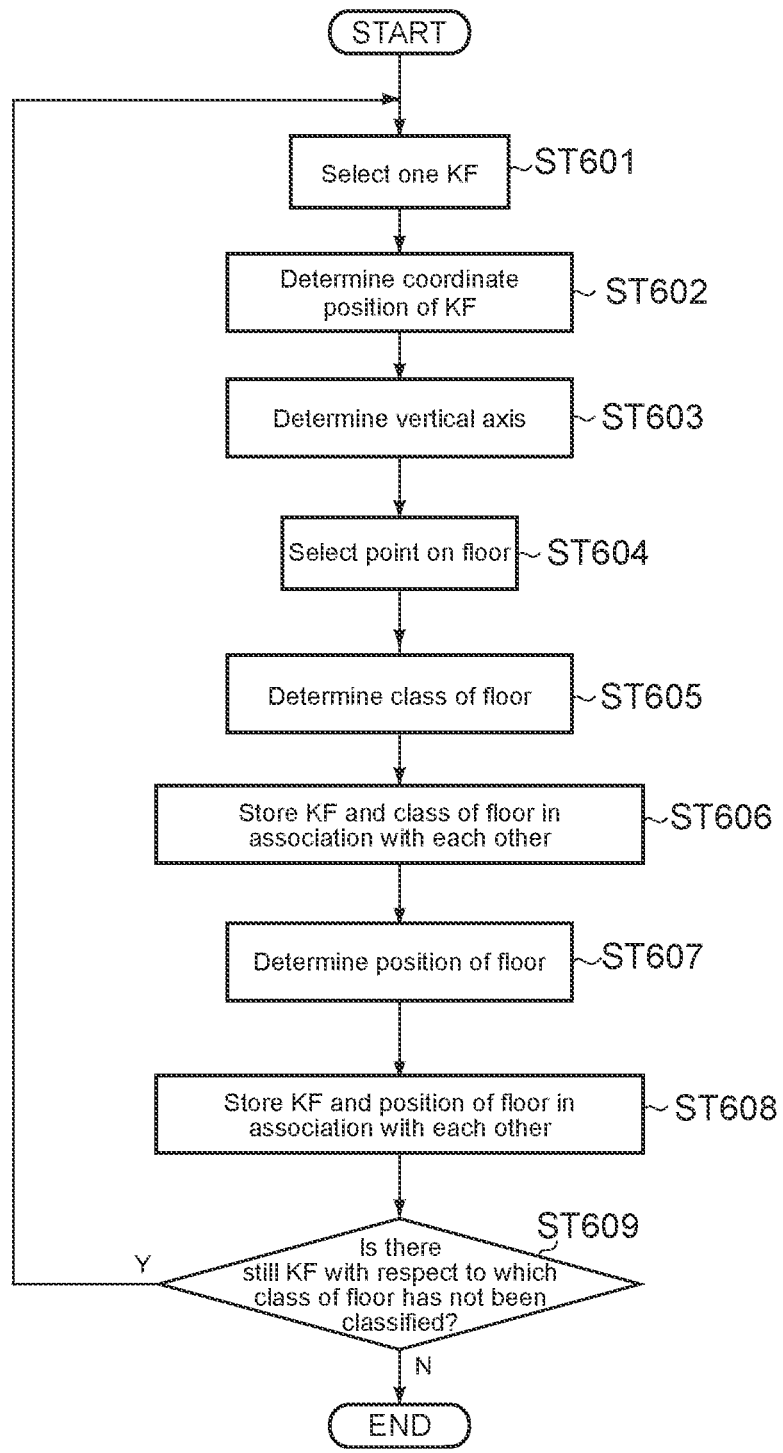
FIG. 12 A flowchart showing class setting processing for a floor of a key frame.
Figure 13:
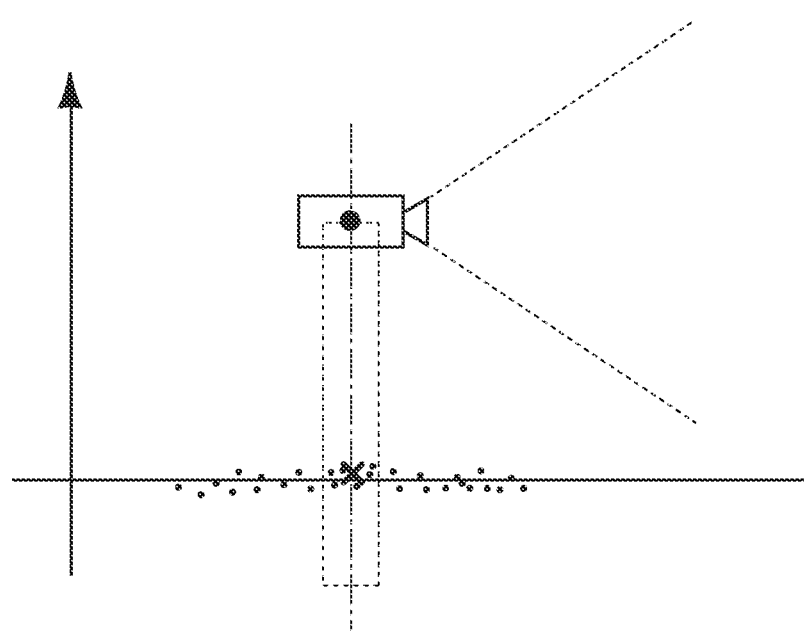
FIG. 13 A schematic diagram showing a state when a class is set to the floor of the key frame.

FIG. 12 is a flowchart showing the class setting processing for the floor of the key frame. FIG. 13 is a schematic diagram showing a state when the class is set to the floor of the key frame.

As shown in FIG. 12, first of all, the control unit 1 selects one key frame from the plurality of key frames in the environment map (Step 601). Next, the control unit 1 determines a coordinate position of that key frame (see the big black circle of FIG. 13) (Step 602). The coordinate position of the key frame is associated with the key frame as metadata.

Next, the control unit 1 determines a vertical axis (see FIG. 13, the long dashed short dashed line) that passes through the coordinate position of the key frame (Step 603). Moreover, at this time, the control unit 1 determines which direction is downward (direction of gravity). It should be noted that in order to determine the vertical axis and the downward direction, the control unit 1 stores information from the inertial sensor 5 as metadata in the environment map, for example, at the time of key frame acquisition or the like, in advance.

Next, the control unit 1 selects a point corresponding to the floor of the key frame from the three-dimensional point cloud (Step 604). In the selection of this point, first of all, the control unit 1 sets a search range of the point (see the dotted-line rectangle in FIG. 13). This search range is set below the coordinate position of the key frame (the big black circle in FIG. 13) in the periphery of the vertical axis (the long dashed short dashed line in FIG. 13).

Next, the control unit 1 selects X-number of points included in the search range from the three-dimensional point cloud (see the dots in FIG. 13). At this time, the control unit 1 preferentially selects X-number of points of the points in the search range, which are located at lower positions.

Next, the control unit 1 determines the class of the floor of that key frame on the basis of the class of each of the selected points (Step 605). At this time, the control unit 1 reads, from the storage unit 2, the class of each of the selected points and sets the most numerous class as the class of the floor of that key frame. Next, the control unit 1 stores the key frame and the class of the floor in association with each other as metadata in the environment map (Step 606).

Next, the control unit 1 determines a position of the floor on the basis of each of the selected points in the search range (Step 607). The position of the floor is, for example, the center of gravity position (see the mark X in FIG. 13) of the point selected in the search range. The position of the floor is used when searching for the route between the first key frame and the second key frame. Next, the control unit 1 stores the key frame and the position of the floor in association with each other as metadata in the environment map (Step 607).

Next, the control unit 1 determines whether there is still a key frame with respect to which the class of the floor has not been determined (Step 609). In a case where there is still a key frame with respect to which the class of the floor has not been determined (YES in Step 609), the control unit 1 returns to Step 601, selects one key frame, and performs the processing after Step 602 again. On the other hand, in a case where with respect to all the key frames, classification of the class of the floor has been completed (NO in Step 609), the control unit 1 terminates the processing.

(Degree of Safety at Position Corresponding to Key Frame)

The degree of safety at the position corresponding to the key frame is determined on the basis of the class of the floor associated with each of the key frames. For example, a key frame in which the class of the floor is a sidewalk, grass, a building floor, a hallway, or the like is determined to have a relatively high degree of safety and such a key frame is preferentially selected as the second key frame. On the other hand, for example, a key frame in which the class of the floor is a roadway, a railroad crossing, a pedestrian crossing, or the like is determined to have a relatively low degree of safety, and such a key frame is not selected as the second key frame. It should be noted that for example, a key frame close to a roadway, a railroad crossing, or a pedestrian crossing may be determined to have a relatively low degree of safety, even though the class of the floor of the key frame is a sidewalk.

(Stairs)

Moreover, in a case where the key frame is located on stairs, such a key frame may be determined to have a relatively low degree of safety and does not need to be selected as the second key frame.

Figure 14:
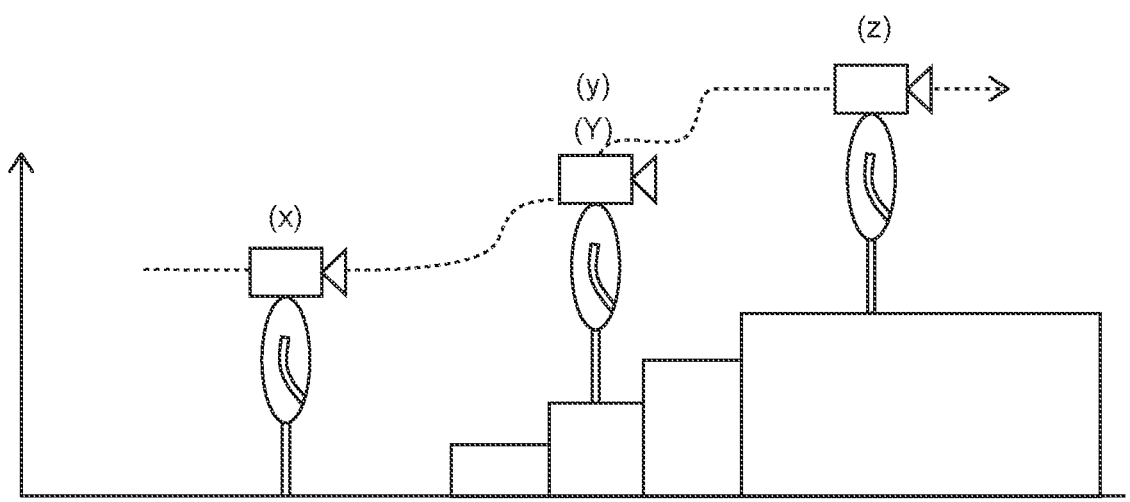
FIG. 14 A diagram showing an example in a case where the key frame is present on stairs.

FIG. 14 is a diagram showing an example in a case where the key frame is present on the stairs. In FIG. 14, a state when the user wearing the head-mounted display 10 moves to the point (x)→the point (y)→the point (z) and the key frame is set to the point (Y) on the stairs is shown.

Whether the key frame is located on the stairs is determined as follows, for example. First of all, the control unit 1 stores, in the storage unit 2, information regarding a height in self-position estimation before the key-frame image is captured (e.g., point (x)). Moreover, the control unit 1 stores a height in self-position estimation when the key-frame image is captured (e.g., point (y)). In addition, the control unit 1 stores, in the storage unit 2, information regarding a height in self-position estimation after the key-frame image is captured (e.g., point (z)).

Then, the control unit 1 determines whether the height before imaging the key frame<the height at the time of imaging the key frame<the height after imaging the key frame is established (in a case where the user steps up the stairs). Moreover, the control unit 1 determines whether the height before imaging the key frame>the height at the time of imaging the key frame>the height after imaging the key frame is established (a case where the user steps down the stairs).

In a case where the height satisfies either one of the conditions, the control unit 1 calculates an absolute value of a difference between the height before imaging the key frame and the height after imaging the key frame and determines that the key frame is located on the stairs (not a slope) in a case where this absolute value is equal to or larger than a predetermined threshold. In this case, the class of the floor that is the stairs is stored in the environment map as metadata of the corresponding key frame. It should be noted that whether the key frame is located on the stairs may be determined on the basis of images at the time of capturing the key-frame image and before and after capturing the key-frame image.

"4. Degree of Safety of Route from First Key Frame"

FIG. 9 will be described continuously. When a key frame having a relatively high degree of safety at the corresponding position is selected as the candidate, then the control unit 1 selects, from the candidates, a key frame having a relatively high degree of safety of the route from the first key frame and further narrows down the candidates of the second key frame (Step 204). In this case, the control unit 1 selects key frames having a degree of safety of the route from the first key frame, which is equal to or larger than a predetermined threshold, as the candidates of the second key frame.

Figure 15:
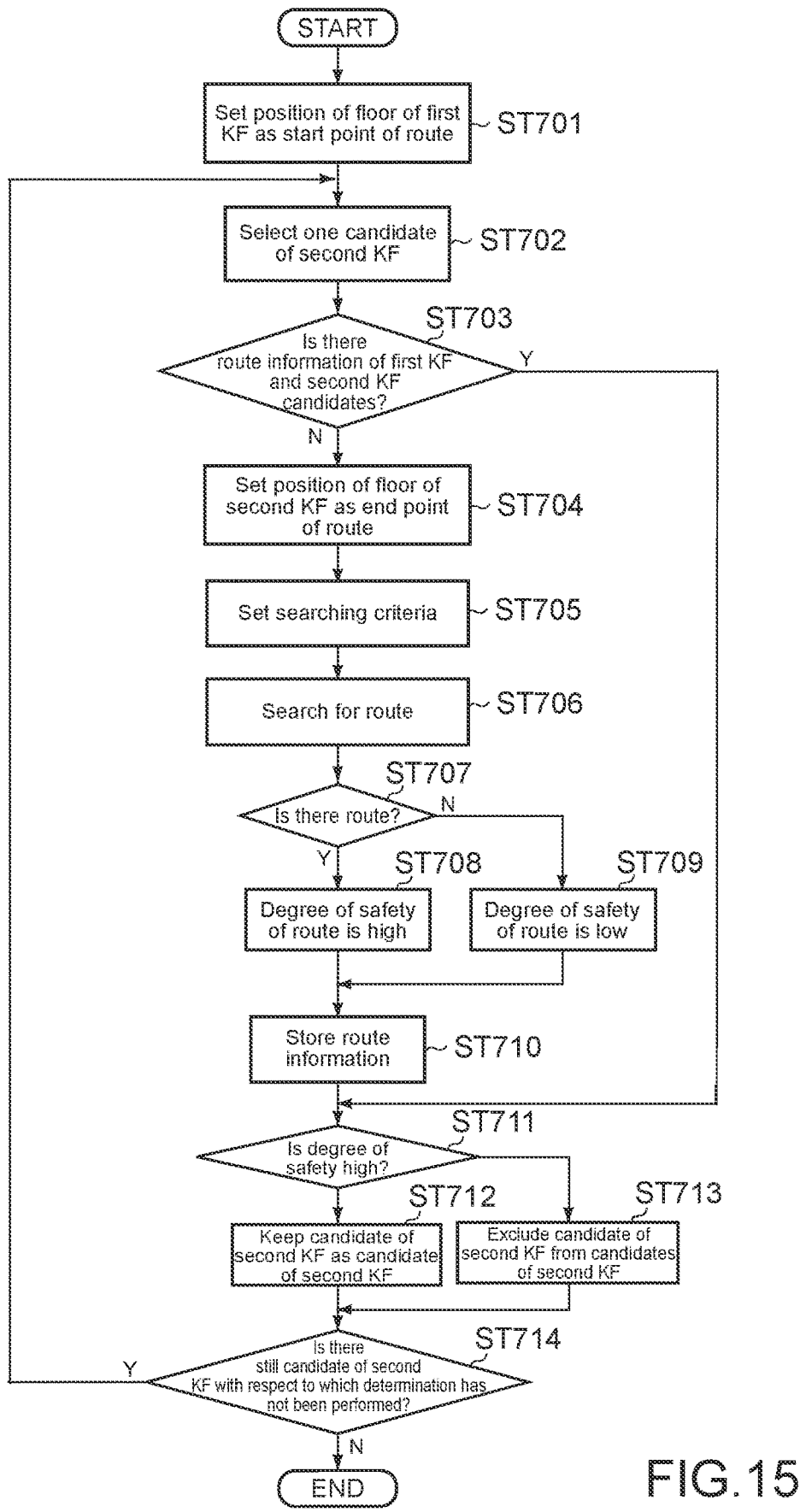
FIG. 15 A flowchart showing processing related to the degree of safety of a route from the first key frame.

How to determine the degree of safety of the route from the first key frame will be described specifically by taking an example. FIG. 15 is a flowchart showing the processing related to the degree of safety of the route from the first key frame.

The control unit 1 first sets a floor position in the first key frame as the start point of the route (Step 701). It should be noted that the floor position in the key frame has already been stored in the environment map in Step 608.

Next, the control unit 1 selects one candidate from the candidates of the second key frame (Step 702). Next, the control unit 1 determines whether route information between the first key frame and the candidate of the second key frame is present (Step 703). The route information includes information regarding the route itself, information regarding the length of the route, and information regarding the degree of safety of the route.

In a case where the route information between the first key frame and the selected candidate of the second key frame is already present (YES in Step 703), the control unit 1 shifts to Step 711. On the other hand, in a case where the route information is not present (NO in Step 703), the control unit 1 performs processing of Steps 704 to 709 in order to generate the route information.

In Step 704, the control unit 1 sets the floor position (see Step 608) of the candidate of the second key frame as the end point of the route. Next, the control unit 1 sets searching criteria of the route (Step 705). The searching criteria are, for example, that it is possible to move between points to which classes such as a sidewalk, a building floor, and a hallway have been assigned with respect to the classified three-dimensional point cloud. Moreover, it is possible to move in a case where the distance between the points to which the classes such as the sidewalk, the building floor, and the hallway have been assigned is equal to or smaller than a predetermined threshold.

Next, under such searching criteria, the control unit 1 applies, with respect to the classified three-dimensional point cloud, a searching algorithm such as an A*searching algorithm and searches for a route between the start point and the end point (Step 706).

Next, the control unit 1 determines whether the route has been found by the searching algorithm (Step 707). In a case where the route has been found and the route is present (YES in Step 707), the control unit 1 determines that the degree of safety of that route is relatively high (Step 708). On the other hand, in a case where the route has not been found and the route is not present (NO in Step 707), the control unit 1 determines that the degree of safety of that route is relatively low (Step 709).

It should be noted that in the example here, in a case where the sidewalk, the building floor, the hallway, or the like is not discontinuous with respect to the route between the position corresponding to the first key frame to the candidate of the second key frame, it is determined that the degree of safety of the route is relatively high. On the other hand, in a case where the sidewalk is discontinuous in the middle due to the pedestrian crossing, the railroad crossing, or the like, it is determined that the degree of safety of the route is relatively low.

It should be noted that even if the sidewalk is discontinuous in the middle due to the pedestrian crossing, the railroad crossing, or the like, in a case where the number of pedestrian crossings or railroad crossings is equal to or smaller than a threshold, it may be determined that the degree of safety of the route is relatively high. It can be adjusted as appropriate by changing the above-mentioned searching criteria (Step 705).

When the degree of safety of the route is determined, then the control unit 1 stores route information including the information regarding the route itself, the information regarding the length of the route, and the information regarding the degree of safety of the route in association with the two key frames (start point and end point) as metadata in the environment map (Step 710). It should be noted that the length of the route may be stored with an associative array using a pair of key frames as a key and the length of the route as a value.

The control unit 1 shifts to next Step 711 in a case where the route information is recorded in Step 710 and in a case where the route information is already present in Step 703. In Step 711, the control unit 1 determines whether the degree of safety of the route of the route between the first key frame and the selected candidate of the second key frame is relatively high on the basis of the information regarding the degree of safety of the route.

In a case where the degree of safety of the route is relatively high (YES in Step 711), the control unit 1 keeps the candidate of the second key frame as the candidate as it is (Step 712). On the other hand, in a case where the degree of safety of the route is relatively low (NO in Step 711), the control unit 1 excludes the second key frame from the candidates (Step 713).

Next, the control unit 1 determines whether there is still a candidate of the second key frame with respect to which whether the degree of safety of the route is high or low has not been determined (Step 714). In a case where there is still a candidate of the second key frame with respect to which whether the degree of safety of the route has not been determined (YES in Step 714), the control unit 1 returns to Step 702, selects a candidate of the second key frame, and performs the processing after Step 703 again. On the other hand, in a case where whether the degree of safety of the route is high or low has been determined with respect to all the candidates of the second key frame (NO in Step 714), the control unit 1 terminates the processing.

FIG. 9 will be described continuously. When the key frames having a relatively high degree of safety of the route are selected as the candidates of the second key frame, then the control unit 1 determines whether the candidates of the second key frame are present (Step 205). That is, the control unit 1 determines whether the candidates of the second key frame that satisfy all the determination criteria of 1. to 4. above are present.

In a case where the candidates of the second key frame are not present (NO in Step 205), the control unit 1 returns to Step 100 and the first key frame selection processing and the temporary initial position setting processing are performed again. On the other hand, in a case where the candidates of the second key frame are present (YES in Step 205), the control unit 1 selects the closest key frame to the current position (the position corresponding to the first key frame) from the candidates of the second key frame (Step 206). At this time, the selected key frame is the second key frame.
"5. Distance from First Key Frame"

For example, the information regarding the length of the route is used as the distance between the first key frame and the candidate of the second key frame. In this case, the control unit 1 selects, from the candidates of the second key frame, one candidate with respect to which the length of the route to the first key frame is shortest, and sets this candidate as the second key frame. It should be noted that in a case where the length of the route has been stored with an associative array using a pair of key frames as a key and using the length of the route as a value, the key frame with respect to which the route is shortest can be selected by sorting the value.

A simple straight line distance, not the length (distance) of the route, may be used as the distance between the first key frame and the candidate of the second key frame. In this case, the control unit 1 determines a straight line distance on the basis of the difference between the coordinates of the first key frame and the coordinates of the second key frame. Then, the control unit 1 selects the candidate of the second key frame with respect to which the straight line distance to the first key frame is shortest, as the second key frame.

"Other Criteria at Time of Second Key Frame Selection"

Next, other criteria at the time of selection of the second key frame will be described.

6. Key-Frame Image is Unlikely to Change Over Time (There Are Few Animals, Vehicles, Plants, etc.)

For example, it is assumed that animals (including humanity), vehicles, plants and the like are shown in the key-frame image. Animals (including humanity) and vehicles are typically stationary and move. Moreover, plants can be flown by winds, and in addition, they grow up over time.

In this case, when estimating the self-position on the basis of the matching between the image from the imaging units 4 and the image of the second key frame in the guide destination, the self-position cannot be estimated in some cases though it must actually be possible to estimate the self-position. In contrast, although it must actually be possible to estimate the self-position, the self-position cannot be estimated in some cases. Therefore, typically, a key frame with respect to which the image at the corresponding position is relatively unlikely to change over time is preferentially selected as the second key frame.

For example, the control unit 1 performs semantic segmentation processing, general object recognition processing, and the like on all the images of the key frames in the environment map. Then, the control unit 1 calculates a rate of the number of pixels of animals, vehicles, or plants to the total number of pixels of the entire image and stores this rate in the environment map as metadata. Then, the control unit 1 preferentially selects a key frame with respect to which the rate is equal to or smaller than a predetermined threshold, as the second key frame.

7. Time from Time of Capturing Key-Frame Image Is Short

If a long time has elapsed from the time of capturing the key-frame image, there is a possibility that it is impossible to correctly perform the self-position estimation based on the matching as in the case of 6. Therefore, typically, a key frame with respect to which the time from the time of imaging is relatively short is preferentially selected as the second key frame.

For example, the control unit 1 stores time information as metadata in the environment map at the time of capturing the key-frame image. Then, the control unit 1 calculates a difference between the time of capturing the key-frame image and the current time and preferentially selects a key frame having a small difference as the second key frame.

8. Change in Sunshine with Respect to Current Sunshine

If a change in sunshine is large with respect to the current sunshine (e.g., sunrise at the current time and sunset in the key frame), there is a possibility that it is impossible to correctly perform the self-position estimation based on the matching as in the cases 6. and 7. Therefore, typically, a key frame with respect to which the change in sunshine is small with respect to the current sunshine is preferentially selected as the second key frame.

In this case, the control unit 1 stores latitude and longitude information and the time of imaging as metadata in the environment map at the time of capturing the key-frame image. It should be noted that in this case, in order to obtain the latitude and longitude information, the head-mounted display 10 is provided with a global positioning system (GPS). Moreover, the control unit 1 determines whether the key-frame image is captured in an outdoor or indoor place by the object recognition processing (or manually by the human), and stores outdoor or indoor information as metadata in the environment map.

In a case where the key frame with which the outdoor metadata is associated is included in the candidates, the control unit 1 performs the following processing when the control unit 1 selects the second key frame. First of all, the control unit 1 estimates the current latitude and longitude (GPS), and also acquires the current time. The control unit 1 estimates the current position of the sun on the basis of the current latitude and longitude and the current time. Moreover, with respect to each of the candidates of the second key frame with which the outdoor metadata is associated, the control unit 1 estimates the position of the sun at the time of imaging the key frame (this processing may be performed in advance and the position of the sun may be stored as metadata).

Next, with respect to the current position of the sun and the position of the sun at the time of imaging the key frame, the control unit 1 calculates a norm of the difference of azimuth (polar coordinates system φ)/altitude (polar coordinates system θ). Then, the control unit 1 determines that a key frame with respect to which the norm value is equal to or smaller than a predetermined threshold is a key frame with respect to which the change in sunshine is small with respect to the current sunshine. Then, the control unit 1 preferentially selects such a key frame as the second key frame.

It should be noted that in a case where the current time is night (between sunset to sunrise) and the time of imaging the key frame is night, the control unit 1 may determine that it is a key frame with respect to which the change in sunshine is small with respect to the current sunshine, and may preferentially select such a key frame as the second key frame.

9. Number of Failures of Matching (Self-Position Estimation) is Smaller

If the self-position estimation based on the matching has failed when selecting a key frame as the second key frame, there is a high possibility that the self-position estimation based on the matching may fail again in a case where such a key frame is selected as the second key frame again. Therefore, typically, a key frame with respect to which the number of failures of the self-position estimation based on the matching is relatively small is preferentially selected as the second key frame.

In a case where the self-position estimation based on the matching has failed, the control unit 1 stores information indicating the number of failures in association with the second key frame as metadata (see Step 411 described below). When the control unit 1 selects the second key frame, the control unit 1 refers to the number of failures and preferentially selects a key frame with respect to which the number of failures is equal to or smaller than a predetermined threshold as the second key frame.

10. Key Frame is not Present in Unreachable Location

For example, in a case where the key frame is present in an unreachable location, e.g., in the sky or above the water, the user cannot move there. Therefore, typically, a key frame that is present in the unreachable location is preferentially selected as the second key frame.

As an example, whether the key frame is present in the sky is determined in the following manner. Referring to FIGS. 12 and 13, for example, the control unit 1 calculates the difference between the coordinates of the key frame (see the big black circle) and the position of the floor after the position of the floor (see the mark X) is determined in Step 604. In a case where this difference is equal to or larger than a predetermined threshold, the control unit 1 determines that the key frame is present in the sky. The control unit 1 excludes such a key frame from the candidates of the second key frame.

11. Key Frame is not in Location where Entering is Limited

For example, in a case where the key frame is present in a location where entering is limited, such as a private road, a private land, a rest room, a school, and a station ticket gate, the user cannot reach the location. Therefore, typically, a key frame that is present at a location where entering is limited is preferentially selected as the second key frame.

For example, the control unit 1 determines whether it is the location where entering is limited by the object recognition processing or the like at the time of generating the key frame. For example, in a case where a living space is largely shown in the image, it may be a private land, and in a case where a toilet is shown in the image, it may be a rest room, and therefore it is determined that entering is limited. Then, in a case where it is determined that the key frame is in the location where entering is limited, the control unit 1 stores an entering limitation flag as metadata in the environment map. The control unit 1 excludes the key frame to which the entering limitation flag has been set from the candidates of the second key frame.

12. User is at Position where Matching (Self-Position Estimation) is Possible in Natural Posture In a case where the key frame is not at a position where the matching is possible in a natural posture (e.g., it is too far from the height of the line of sight of the user, too close to the ground, or sideways), the user has to take an unnatural posture. Therefore, typically, a key frame that is at a position where the user can perform the self-position estimation based on the matching in a natural posture is preferentially selected as the second key frame.

Whether it is close to the height of the line of sight of the user can be determined by the following processing. For example, the control unit 1 calculates a difference between the height of the temporary initial position (see Step 106) and the height of the key frame in the environment map. The control unit 1 determines that a key frame with respect to which the difference is equal to or smaller than a threshold is the key frame close to the height of the line of sight of the user and preferentially selects that key frame as the second key frame.

Whether it is too close to the ground can be determined by the following processing. Referring to FIGS. 12 and 13, for example, after the control unit 1 determines the position of the floor (see the mark X) in Step 604, the control unit 1 calculates a difference between the coordinates of the key frame (see the big black circle) and the position of the floor.

In a case where this difference is equal to or smaller than a predetermined threshold, it is determined that the key frame is too close to the ground. The control unit 1 excludes such a key frame from the candidates of the second key frame.

13. Up and Down Movements are Few at Time of Movement to Corresponding Position

If the user needs to use stairs or an elevator or to sit or stand at the time of movement to the position corresponding to the key frame, the user gets tired. Therefore, typically, a key frame with respect to which up and down movements are few at the time of movement to the corresponding position is preferentially selected as the second key frame.

In this case, for example, the control unit 1 calculates a difference between the height of the temporary initial position (see Step 106) and the height of the key frame in the environment map. The control unit 1 determines that a key frame with respect to which the difference is equal to or smaller than a threshold is the key frame with respect to which the up and down movements are few and preferentially selects that key frame as the second key frame.

14. Floor is Flat

If the floor has irregularities, the user gets tired at the time of movement. Therefore, typically, a key frame with respect to which the degree of flatness of the floor on the route from the first key frame is relatively high is preferentially selected as the second key frame.

In this case, the control unit 1 determines the degree of flatness of the floor on the route between the first key frame and the candidate of the second key frame on the basis of the information regarding the three-dimensional point cloud. For example, the control unit 1 calculates each of integrated values of the amount of change in the height of the floor on the route. Then, the control unit 1 determines that a key frame with respect to which the integrated value is equal to or smaller than a predetermined threshold is the key frame with respect to which the degree of flatness of the floor is relatively high and preferentially selects that key frame as the second key frame.

It should be noted that as the determination criteria in the selection of the second key frame, it is typically sufficient to use at least one or more determination criteria of 1. to 14., and the determination criteria of 1. to 14. can be combined with each other as appropriate.

[Guide Processing]

Figure 16:
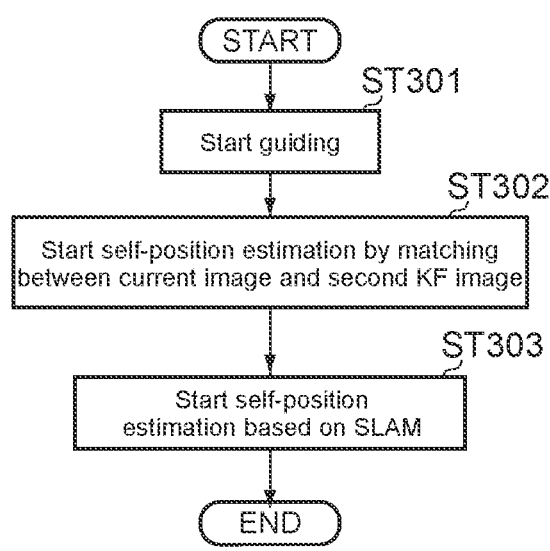
FIG. 16 A flowchart showing guide processing.

Next, guide processing of guiding the user to the position corresponding to the second key frame from the position corresponding to the first key frame will be described specifically. FIG. 16 is a flowchart showing the guide processing.

As shown in FIG. 16, after the second key frame is selected, the control unit 1 starts the content output for guiding the user to the position corresponding to the second key frame (Step 301). This guiding is performed on the basis of the route information. In the lower left example of FIG. 6, a state when the user is guided to the position of the key frame of the point (H) selected as the second key frame is shown.

Figure 17:
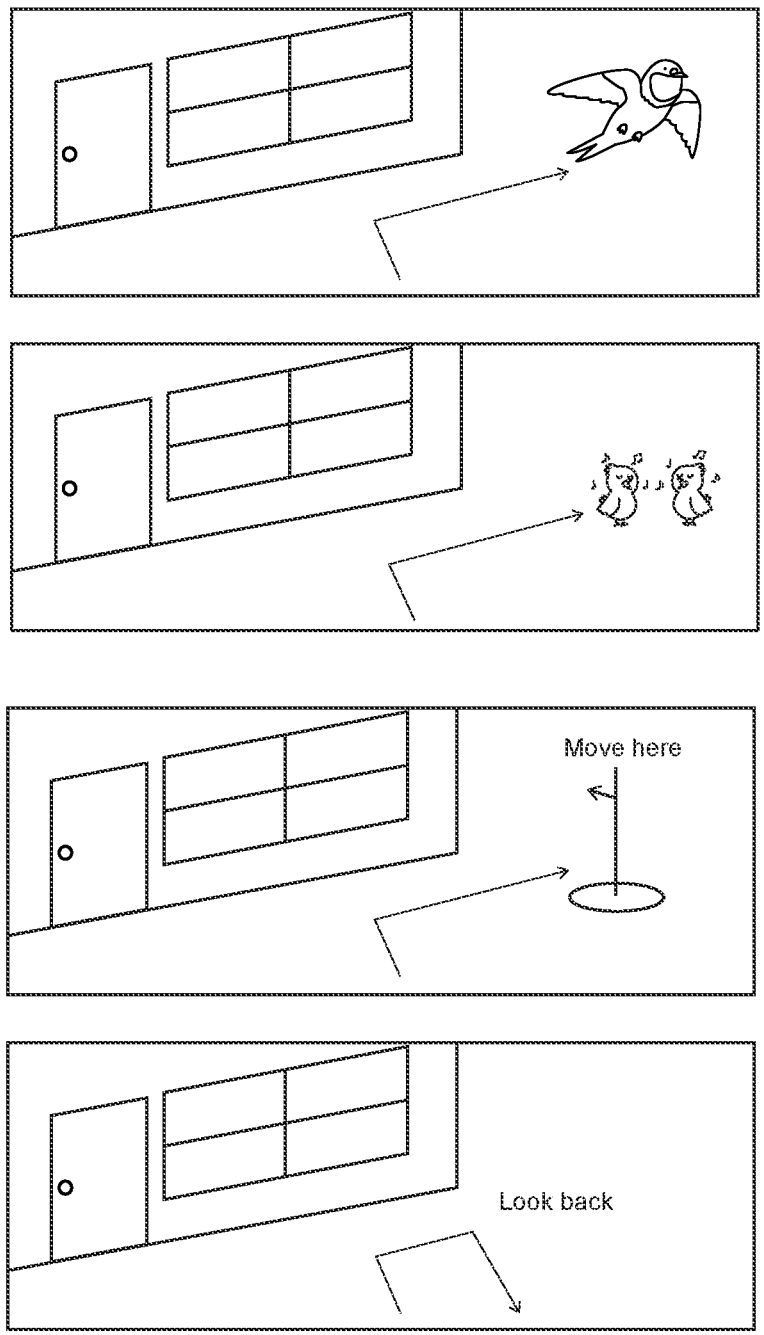
FIG. 17 A diagram showing examples of content output in the guide.

FIG. 17 is a diagram showing examples of the content output in the guide. An example in a case where a virtual object of a bird that guides the user to the position corresponding to the second key frame is displayed in augmented reality is shown in the uppermost part of FIG. 17. Moreover, in this example, the arrow indicating the route to the position corresponding to the second key frame is displayed in augmented reality. In this example, the user can naturally move to the position corresponding to the second key frame by running after the virtual object of the bird that is flying about and moving along the arrow of the route.

Moreover, in this example, after the user moves to the position corresponding to the second key frame, the AR display in which the virtual object of the bird appears to be flying in the direction depending on the orientation of the second key frame is performed. The user can naturally face in the direction corresponding to the second key frame by following the virtual object of the bird that are flying in that direction with the eyes.

Moreover, in the second uppermost part of FIG. 17, the virtual object of the bird is displayed in augmented reality at the position corresponding to the second key frame, and also, an example in a case where the loudspeaker 7 outputs the bird's singing sound (or the bird's voice saying "Move here") is shown. Moreover, in this example, the arrow indicating the route to the position corresponding to the second key frame is displayed in augmented reality. The user can naturally move to the position corresponding to the second key frame by moving to the position of the virtual object of the bird along the arrow of the route.

Moreover, in this example, after the user moves to the position corresponding to the second key frame, the AR display in which the virtual object of the bird appears to be flying away in the direction depending on the orientation of the second key frame. Moreover, the sound of the bird that has flied away saying "Look" is output from the loudspeaker 7. The user can naturally face in the direction corresponding to the second key frame by following the virtual object of the bird flying away in that direction with the eyes or listening to the voice of the bird.

In the third uppermost part of FIG. 17, an example in a case where a virtual object of a text saying "Move here" and virtual objects of virtual objects indicating a circle, a pin, and an extension orientation from the pin are displayed in augmented reality at the position corresponding to the second key frame is shown. Moreover, in this example, the arrow indicating the route to the position corresponding to the second key frame is displayed in augmented reality. In this example, the user can naturally move to the position corresponding to the second key frame and face in the direction corresponding to the second key frame by moving to the position where the pin in the circle stands along the arrow of the route and facing in the direction of the arrow provided to the pin.

In the lowermost part of FIG. 17, the position corresponding to the second key frame is at the position invisible from the user, and therefore an example in a case where a virtual object of a text saying "Turn back" is displayed in augmented reality is shown. It should be noted that even in a case where the position corresponding to the second key frame is at the position invisible from the user, the virtual object is arranged at a position visible from the user in this manner and a next behavior is instructed.

The virtual object may be an object related to the application to be executed. For example, in a case where the application to be executed is a game or the like, the virtual object may be a character that appears in the game or the like.

The content output for guiding may be vibration. In this case, for example, the vibrators are provided in the right temple portion 13 and the left temple portion 14, respectively. Then, the vibrator of the right temple portion 13 is made to vibrate for causing the user to move right or turn right, and the vibrator of the left temple portion 14 is made to vibrate for causing the user to move left or turn left.

The content output for guiding can be performed in any format as long as the content output for guiding is performed in a format perceivable to the user. Typically, the content in the content output for guiding may be at least one of an image, sound, or vibration.

Referring back to FIG. 16, when the content output in the guide is started, then the control unit 1 starts the self-position estimation (first self-position estimation) based on the matching between an image (environment information) currently captured by the imaging units 4 and the image of the second key frame (Step 302).

That is, after the content output in the guide is started, the control unit 1 compares the feature points of the image currently captured by the imaging units 4 with the feature points of the second key frame and constantly determines whether the matching has been achieved between the image by the imaging units 4 and the second key frame and the self-position has been estimated.

When the self-position estimation based on the matching is started, then the control unit 1 starts the self-position estimation (second self-position estimation) based on the SLAM (Step 303). In this self-position estimation, the control unit 1 estimates the self-position on the basis of the temporary initial position set in Step 106. In the self-position estimation based on the SLAM, the control unit 1 estimates the current self-position and the attitude on the basis of the feature points of the image currently acquired, the amount of change in feature points of the past image (e.g., image preceding several frames), and the inertial information acquired from the inertial sensor 5.

[Matching Processing with Second Key Frame and Redo Processing]

Figure 18:
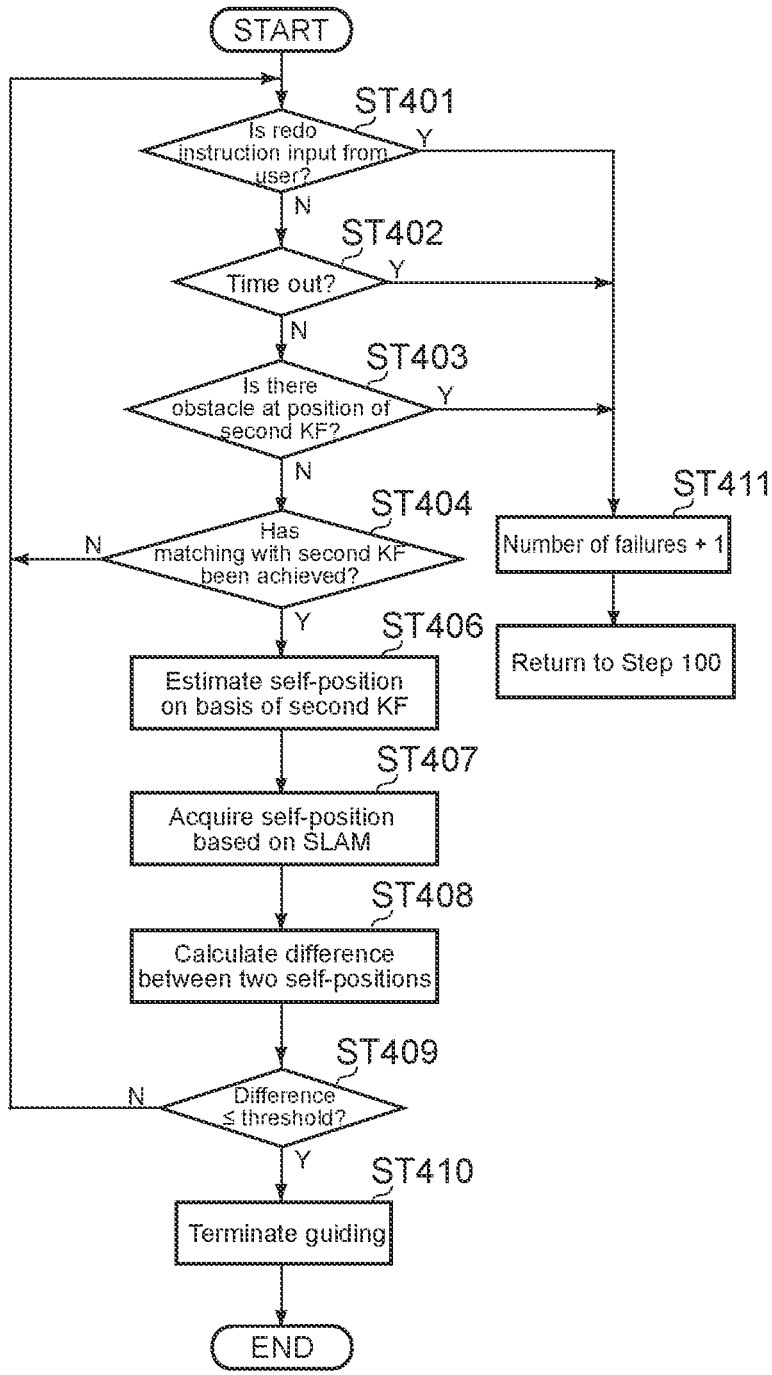
FIG. 18 A flowchart showing matching processing with the second key frame and redo processing.

Next, the matching processing with the second key frame and the redo processing will be described specifically. FIG. 18 is a flowchart showing the matching processing with the second key frame and the redo processing.

As shown in FIG. 18, first of all, the control unit 1 determines whether a redo instruction is input from the user (Step 401). Here, if the temporary initial position is correct, there is nothing on the route to the position corresponding to the second key frame or at the position corresponding to the second key frame, and the user can smoothly reach the position corresponding to the second key frame following the guide. On the other hand, in a case where the temporary initial position is incorrect, there may be no road or the guide destination may be set an unexpected position even when the user moves following the guide.

Figure 19:
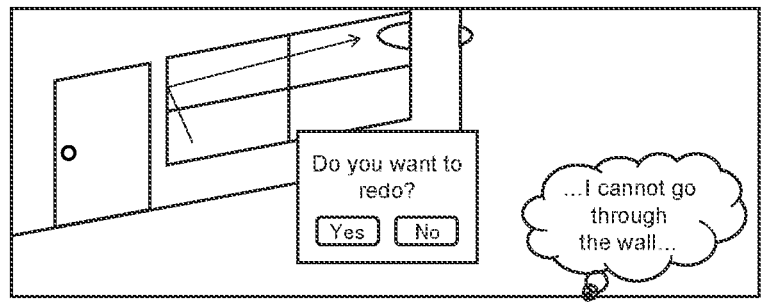
FIG. 19 A diagram showing an example of a redo instruction by the user.

For example, in such a case, the redo instruction is input from the user. FIG. 19 is a diagram showing an example of the redo instruction by the user. In the example shown in FIG. 19, a state when the guide destination has been set inside a wall because the temporary initial position is incorrect is shown.

In the middle of the display unit 3, an image for the redo selection including the text "Do you want to redo?" and the text "YES" and "NO" is displayed. The control unit 1 causes this image to be displayed in accordance with the user's operation on the operation unit 6, for example. Moreover, when "YES" is selected in accordance with the user's operation on the operation unit 6, the control unit 1 determines that the redo instruction is input from the user.

In a case where the redo instruction is input from the user (YES in Step 401), it is assumed that the control unit 1 increments the number of failures by one (Step 411). Then, the control unit 1 stores this number of failures as metadata corresponding to the key frame currently selected as the second key frame in the environment map. This number of failures is used as the determination criteria at the time of selection of the second key frame, for example (see 9. above).

After the number of failures stored, the control unit 1 returns to Step 100 and redoes the processing from the start (redo processing). In the redo processing, the first key frame is re-selected at the current position and the temporary initial position is reset on the basis of that key frame. Moreover, the second key frame is re-selected, the content output in the guide to the position of the re-selected second key frame is performed, and the image at that position is acquired.

In a case where the redo instruction is not input from the user (NO in Step 401), then the control unit 1 determines whether the timer has timed out (Step 402). This timer starts counting at the timing at which the content output in the guiding is started, and times out after a predetermined time (e.g., about 5 minutes) from a guiding start.

In a case where the timer has timed out (YES in Step 402), in a manner similar to that in a case where the redo instruction is made, the control unit 1 increments the number of failures by one and stores this number of failures as metadata in the environment map (Step 411). Then, the control unit 1 returns to Step 100 and redoes the processing from the start (redo processing).

That is, in a case where the matching between the image from the imaging units 4 and the second key frame has not been achieved and the self-position estimation has not been performed even when the predetermined time has elapsed from the guiding start, the control unit 1 determines that the temporary initial position was incorrect with a high possibility, and redoes the processing from the start.

In a case where the timer has not yet timed out (NO in Step 402), the control unit 1 determines whether the obstacle is present at the position corresponding to the second key frame (Step 403).

Figure 20:
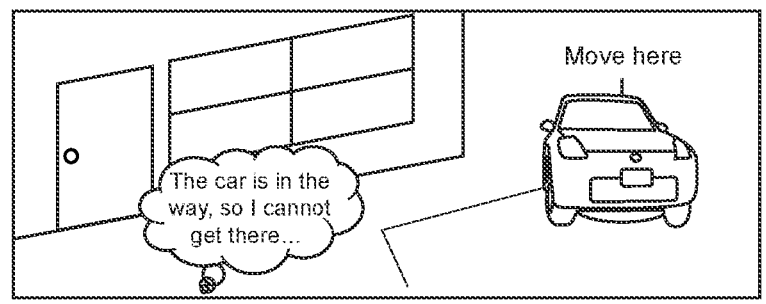
FIG. 20 A diagram showing an example when an obstacle is present at a position corresponding to the second key frame.

FIG. 20 is a diagram showing an example when the obstacle is present at the position corresponding to the second key frame. In FIG. 20, a car is present as an obstacle at the position of the second key frame (guide destination).

Here, even if the temporary initial position was correct, the obstacle such as the car may be present at the position corresponding to the second key frame. For example, although the obstacle such as the car was not the corresponding position at the time of imaging the key frame, the obstacle may be present currently. In this case, the user cannot move to the position corresponding to the second key frame due to the presence of the obstacle.

The control unit 1 determines whether an obstacle is present at the position corresponding to the second key frame by, for example, general object recognition, a depth sensor, or the like. In a case where an obstacle is present (YES in Step 403), in a manner similar to that in the case of the redo instruction or time out, the control unit 1 increments the number of failures by one and stores this number of failures as metadata in the environment map (Step 411). Then, the control unit 1 returns to Step 100 and redoes the processing from the start (redo processing).

On the other hand, in a case where an obstacle is not present at the position corresponding to the second key frame (NO in Step 403), the control unit 1 compares the feature points of the image currently captured by the imaging units 4 with the feature points of the second key frame and determines whether the matching has been achieved (Step 404). It should be noted that in Step 404, the control unit 1 determines whether the temporary initial position was correct on the basis of the second key frame and the image information (environment information) acquired at the position corresponding to the second frame.

In a case where the matching has not been achieved (NO in Step 404), the control unit 1 returns to Step 401 and determines whether a redo instruction has been issued from the user.

On the other hand, in a case where the matching has been achieved (YES in Step 404), the control unit 1 performs matching of feature points in a common region of the region included in the image currently captured by the imaging units 4 and the region included in the image of the second key frame and estimates the current self-position (first self-position) (Step 406).

Next, the control unit 1 acquires the self-position (second self-position) based on the SLAM (see Step 303) from the storage unit 2 (Step 407). Then, the control unit 1 calculates a difference between the self-position (first self-position) based on the matching with the second key frame and the self-position (second self-position) based on the SLAM (Step 408).

Referring to the lower right part of FIG. 6, in this example, a state in which the second key frame is present at the point (H) and the self-position is estimated at the point (h) by the self-position estimation based on the matching with this second key frame is shown. Moreover, in this example, a state when the self-position is estimated at the point (h') by the self-position estimation based on the SLAM is shown. In Step 408, for example, a difference between the self-position of the point (h) and the self-position of the position (h') is calculated.

Next, the control unit 1 determines whether the difference is equal to or smaller than a predetermined threshold (Step 409). It should be noted that in Step 409, the control unit 1 determines whether the temporary initial position was correct on the basis of the difference between the self-position based on the matching with the second key frame and the self-position based on the SLAM.

In a case where the difference is above the threshold (NO in Step 409), the control unit 1 returns to Step 401. On the other hand, in a case where the difference is equal to or smaller than a threshold (YES in Step 410), the control unit 1 determines that the self-position has been correctly identified (the temporary initial position was correct) and terminates the content output in the guide (Step 410). It should be noted that in order to improve the accuracy, the same processing (redo processing) may be performed again by returning to Step 100 thereafter.

After the control unit 1 terminates guiding, the control unit 1 starts the application. At this time, although the self-position estimation based on the matching with the second key frame is terminated, the self-position estimation based on the SLAM is continuously performed.

Here, it is assumed that a key frame was present that does not satisfies, at the time of selection of the second key frame, all the determination criteria of Steps 201 to 204 (high degree of uniqueness, non-similarity, safe position, safe route) but satisfies some of them (e.g., high degree of uniqueness). That is, it is assumed that the key frame eventually not selected as the second key frame was present. In the description here, such a key frame will be referred to as a quasi-second key frame for the sake of convenience.

After the start of the content output in the guide, the control unit 1 performs the self-position estimation based on matching between the image currently captured by the imaging units 4 and the second key frame (see Step 302, Step 404) and determines whether the temporary initial position was correct. On the other hand, the control unit 1 may perform not only matching between the image currently captured by the imaging units 4 and the second key frame but also matching between the image currently captured by the imaging units 4 and the quasi-second key frame.

In this case, for example, if the quasi-second key frame is present on the halfway of the route in the guide to the second key frame, the self-position estimation based on the matching with this quasi-second key frame may be successful. In such a case, the control unit 1 may thereafter perform Steps 406 to 409, and may determine that the self-position has been correctly identified (the temporary initial position was correct) in a case where the difference is equal to or smaller than a threshold.

<Actions, Etc.>

In this embodiment, the second key frame different from the first key frame assumed to correspond to the current self-position is selected from the plurality of key frames to be used in self-position estimation. Then, the content output in the guide to the position corresponding to the second key frame is performed, and the environment information to be used in self-position estimation is acquired at the position corresponding to the second key frame.

Accordingly, for example, even if a plurality of key frames including images based on similar views is present and the initial position (self-position) has been set at an incorrect position, it is possible to correctly determine whether the initial position (self-position) was correct. Accordingly, the accuracy of the self-position estimation can be improved.

Moreover, in this embodiment, a key frame having a relatively high degree of uniqueness is preferentially selected as the second key frame. Moreover, a key frame having a relatively low degree of similarity to the first key frame is preferentially selected as the second key frame. Accordingly, the above-mentioned double erroneous determination can be prevented, and the accuracy of the self-position estimation can be improved.

Moreover, in this embodiment, a key frame having a relatively high degree of safety at the corresponding position is preferentially selected as the second key frame. Moreover, a key frame having a relatively high degree of safety of the route from the first key frame is preferentially selected as the second key frame. Accordingly, the safety for the user can be ensured.

Moreover, in this embodiment, a key frame having a relatively short distance from the first key frame is preferentially selected as the second key frame. Accordingly, the user can be prevented from getting tired, and also the application can be quickly started. Moreover, in this embodiment, a key frame with respect to which the image at the corresponding position is relatively unlikely to change over time is preferentially selected as the second key frame. Accordingly, the matching can be suitably performed at the position corresponding to the second key frame.

Moreover, in this embodiment, the content output in the guide is performed in a format perceivable to the user. Moreover, the content in the content output is at least one of an image, sound, or vibration. Accordingly, the user can be suitably guided.

Moreover, in this embodiment, whether the initial position was correct is determined on the basis of the second key frame and the environment information acquired at the position corresponding to the second frame. Moreover, whether the initial position was correct is determined on the basis of matching between the second key frame and the environment information acquired at the position corresponding to the second key frame. Accordingly, whether the initial position was correct can be suitably determined.

Moreover, in this embodiment, whether the initial position was correct is determined on the basis of the difference between the self-position based on the matching with the second key frame and the self-position based on the SLAM using the initial position as the basis. Accordingly, whether the initial position was correct can be suitably determined.

Moreover, in this embodiment, the redo processing in which the second key frame is re-selected under a predetermined condition and the content output for guiding to the position of the re-selected second key frame is performed is performed. Accordingly, in a case where the initial position was incorrect, the initial position can be suitably modified.

Various Modified Examples

Hereinabove, the case where the head-mounted display 10 performs the above-mentioned respective processes has been described. On the other hand, for example, an external device such as a mobile phone (including a smartphone), a PC (e.g., tablet PC, laptop PC, desktop PC), and a server device on a network may perform the above-mentioned respective processes. In this case, information such as an environment map necessary for the processing is stored in the external device, and also the head-mounted display 10 sends the information such as the image by the imaging units 4 to the external device as necessary. Moreover, the head-mounted display 10 may perform some of the above-mentioned respective processes and the external device may perform the other processes.

Although the head-mounted display 10 has been described as an example of the information processing apparatus hereinabove, the information processing apparatus is not limited thereto. For example, the information processing apparatus may be a wearable device other than the head-mounted display 10, such as a wrist-type, a ring-type, and a pendant-type. Alternatively, the information processing apparatus may be a mobile phone (including a smartphone) or may be a PC or a server device on a network. Typically, the information processing apparatus may be any apparatus as long as it can perform the processing of the self-position estimation.

The present technology can also take the following configurations.

(1) An information processing apparatus, including
a control unit that selects, from a plurality of key frames to be used in self-position estimation, a second key frame different from a first key frame assumed to correspond to a current self-position, performs content output for guiding to a position corresponding to the second key frame, and acquires environment information to be used in self-position estimation at the position corresponding to the second key frame.

(2) The information processing apparatus according to (1), in which
the control unit preferentially selects a key frame having a relatively high degree of uniqueness as the second key frame.

(3) The information processing apparatus according to (1) or (2), in which
the control unit preferentially selects a key frame having a relatively low degree of similarity to the first key frame as the second key frame.

(4) The information processing apparatus according to any one of (1) to (3), in which the control unit preferentially selects a key frame having a relatively high degree of safety at the corresponding position as the second key frame.

(5) The information processing apparatus according to any one of (1) to (4), in which
the control unit preferentially selects a key frame having a relatively high degree of safety of a route from the first key frame as the second key frame.

(6) The information processing apparatus according to any one of (1) to (5), in which
the control unit preferentially selects a key frame having a relatively short distance from the first key frame as the second key frame.

(7) The information processing apparatus according to any one of (1) to (6), in which
the control unit preferentially selects a key frame with respect to which an image at the corresponding position is relatively unlikely to change over time as the second key frame.

(8) The information processing apparatus according to any one of (1) to (7), in which
the control unit performs the content output in a format perceivable to the user.

(9) The information processing apparatus according to (8), in which
content in the content output includes at least one of an image, sound, or vibration.

(10) The information processing apparatus according to any one of (1) to (9), in which
the control unit sets an initial position on the basis of the first frame.

(11) The information processing apparatus according to (10), in which
the control unit determines whether the initial position is correct on the basis of the second key frame and the environment information acquired at the position corresponding to the second frame.

(12) The information processing apparatus according to (11), in which
the control unit determines whether the initial position is correct on the basis of matching between the second key frame and the environment information acquired at the position corresponding to the second key frame.

(13) The information processing apparatus according to (12), in which
the control unit performs first self-position estimation of estimating the self-position on the basis of matching with the second key frame and second self-position estimation of estimating the self-position by using the initial position as a basis.

(14) The information processing apparatus according to (13), in which
the control unit determines whether the initial position is correct on the basis of a difference between a first self-position resulting from the first self-position estimation and a second self-position resulting from the second self-position estimation.

(15) The information processing apparatus according to any one of (1) to (14), in which
the control unit performs redo processing of re-selecting the second key frame under a predetermined condition and performing content output for guiding to a position of the re-selected second key frame.

(16) The information processing apparatus according to (15), in which
the condition is that a redo instruction is input from a user.

(17) The information processing apparatus according to (15) or (16), in which
the condition is that a predetermined time has elapsed from a guiding start.
(18) The information processing apparatus according to any one of (15) to (17), in which
the condition is that an obstacle is present at the position of the second key frame.
(19) An information processing method, including:
selecting, from a plurality of key frames to be used in self-position estimation, a second key frame different from a first key frame assumed to correspond to a current self-position;
performing content output for guiding to a position corresponding to the second key frame; and
acquiring environment information to be used in self-position estimation at the position corresponding to the second key frame.
(20) A program that causes a computer to execute processing of:
selecting, from a plurality of key frames to be used in self-position estimation, a second key frame different from a first key frame assumed to correspond to a current self-position;
performing content output for guiding to a position corresponding to the second key frame; and
acquiring environment information to be used in self-position estimation at the position corresponding to the second key frame.

REFERENCE SIGNS LIST

1 control unit
2 storage unit
3 display unit
4 imaging unit
10 head-mounted display

The invention claimed is:
1. An information processing apparatus, comprising:
a central processing control unit (CPU) configured to:
select, from a plurality of key frames, a second key frame different from a first key frame of the plurality of key frames, wherein
the first key frame corresponds to a first position of the information processing apparatus,
the second key frame corresponds to a second position of the information processing apparatus, and
a degree of uniqueness of the second key frame is higher than a degree of uniqueness of a third key frame of the plurality of key frames;
output content to guide a user of the information processing apparatus to the second position corresponding to the second key frame;
acquire, based on the output content, environment information at the second position corresponding to the second key frame; and
estimate the second position of the information processing apparatus based on the acquired environment information.
2. The information processing apparatus according to claim 1, wherein degree of similarity of the second key frame to the first key frame is lower than a degree of similarity of the third key frame to the first key frame.
3. The information processing apparatus according to claim 1, wherein a degree of safety at the second position corresponding to the second key frame is higher than a degree of safety at a third position, of the information processing apparatus, corresponding to the third key frame.
4. The information processing apparatus according to claim 1, wherein a degree of safety of a route between the second key frame and the first key frame is higher than a degree of safety of a route between the third key frame and the first key frame.
5. The information processing apparatus according to claim 1, wherein a distance of the second key frame from the first key frame is shorter than a distance of the third key frame from the first key frame.
6. The information processing apparatus according to claim 1, wherein an image at the second position corresponding to the second key frame does not change over time.
7. The information processing apparatus according to claim 1, wherein the CPU is further configured to output the content output in a format perceivable to the user.
8. The information processing apparatus according to claim 7, wherein the content includes at least one of an image, a sound, or a vibration.
9. The information processing apparatus according to claim 1, wherein the CPU is further configured to set the first position based on the first key frame.
10. The information processing apparatus according to claim 9, wherein the CPU is further configured to determine the first position is correct, based on the second key frame and the acquired environment information.
11. The information processing apparatus according to claim 10, wherein the CPU is further configured to determine the first position is correct based on a match between the second key frame and the acquired environment information.
12. The information processing apparatus according to claim 11, wherein the CPU is further configured to:
perform first self-position estimation to estimate the second position, wherein the first self-position estimation is performed based on the match; and
perform second self-position estimation to estimate a third position of the information processing apparatus, wherein the second self-position estimation is performed based on the first position.
13. The information processing apparatus according to claim 12, wherein the CPU is further configured to determine the first position is correct, based on a difference between the second position that results from the first self-position estimation and the third position that results from the second self-position estimation.
14. The information processing apparatus according to claim 1, wherein the CPU is further configured to:
re-select the second key frame based on a specific condition; and
output the content to guide the user to a third position of the re-selected second key frame.
15. The information processing apparatus according to claim 14, wherein the specific condition corresponds to a redo instruction input from the user.
16. The information processing apparatus according to claim 14, wherein the specific condition corresponds to an elapse of a specific time from a start of the output of the content.
17. The information processing apparatus according to claim 14, wherein the specific condition corresponds to an obstacle present at the second position corresponding to the second key frame.
18. An information processing method, comprising:
in an information processing apparatus:

selecting, from a plurality of key frames, a second key frame different from a first key frame of the plurality of key frames, wherein
the first key frame corresponds to a first position of the information processing apparatus,
the second key frame corresponds to a second position of the information processing apparatus, and
a degree of uniqueness of the second key frame is higher than a degree of uniqueness of a third key frame of the plurality of key frames;
outputting content for guiding a user of the information processing apparatus to the second position corresponding to the second key frame;
acquiring, based on the output content, environment information at the second position corresponding to the second key frame; and
estimating the second position of the information processing apparatus based on the acquired environment information.

19. A non-transitory computer-readable medium having stored thereon, computer-executable instructions which, when executed by a processor of an information processing apparatus, cause the processor to execute operations, the operations comprising:
selecting, from a plurality of key frames, a second key frame different from a first key frame of the plurality of key frames, wherein
the first key frame corresponds to a first position of the information processing apparatus,
the second key frame corresponds to a second position of the information processing apparatus, and
a degree of uniqueness of the second key frame is higher than a degree of uniqueness of a third key frame of the plurality of key frames;
outputting content for guiding a user of the information processing apparatus to the second position corresponding to the second key frame;
acquiring, based on the output content, environment information at the second position corresponding to the second key frame; and
estimating the second position of the information processing apparatus based on the acquired environment information.

20. An information processing apparatus, comprising:
a central processing unit (CPU) configured to:
select, from a plurality of key frames, a second key frame different from a first key frame of the plurality of key frames, wherein
the first key frame corresponds to a first position of the information processing apparatus,
the second key frame corresponds to a second position of the information processing device, and
a degree of similarity of the second key frame to the first key frame is lower than a degree of similarity of a third key frame, of the plurality of key frames, to the first key frame;
output content to guide a user of the information processing apparatus to the second position corresponding to the second key frame;
acquire, based on the output content, environment information at the second position corresponding to the second key frame; and
estimate the second position of the information processing apparatus based on the acquired environment information.

* * * * *